(12) United States Patent
Finn et al.

(10) Patent No.: US 11,948,036 B2
(45) Date of Patent: Apr. 2, 2024

(54) RFID ENABLED METAL TRANSACTION CARDS

(71) Applicant: Metaland LLC, Doral, FL (US)

(72) Inventors: David Finn, Fussen Weissensee (DE); Darren Molloy, Killour (IE); Daniel Pierrard, Walton, KY (US)

(73) Assignee: Metaland LLC, Doral, FL (US)

( * ) Notice: Subject to any disclaimer, the term of this patent is extended or adjusted under 35 U.S.C. 154(b) by 0 days.

(21) Appl. No.: 17/866,547

(22) Filed: Jul. 17, 2022

(65) Prior Publication Data
US 2024/0028860 A1 Jan. 25, 2024

(51) Int. Cl.
*G06K 19/06* (2006.01)
*G06K 19/077* (2006.01)

(52) U.S. Cl.
CPC . *G06K 19/07722* (2013.01); *G06K 19/07773* (2013.01)

(58) Field of Classification Search
CPC ......... G06K 19/07749; G06K 19/0723; G06K 19/077; G06K 19/07; G06K 19/07722; G06K 19/07758; G06Q 20/357; G06Q 20/3278; G06F 3/044
USPC .............. 235/487, 492, 486, 462.46, 472.02
See application file for complete search history.

(56) References Cited

U.S. PATENT DOCUMENTS

| | | | | |
|---|---|---|---|---|
| 9,475,086 B2 * | 10/2016 | Finn | ..................... | B23K 26/361 |
| 9,836,684 B2 * | 12/2017 | Finn | ................. | G06K 19/07722 |
| 2013/0126622 A1 * | 5/2013 | Finn | ....................... | H05K 3/103 |
| | | | | 29/601 |
| 2015/0180229 A1 * | 6/2015 | Herslow | .......... | G06K 19/07749 |
| | | | | 156/60 |
| 2018/0207903 A1 | 7/2018 | Lowe | | |
| 2021/0049431 A1 * | 2/2021 | Finn | ................. | G06K 19/07722 |

OTHER PUBLICATIONS

ISR from PCT/IB2022/056569.

* cited by examiner

*Primary Examiner* — Daniel St Cyr
(74) *Attorney, Agent, or Firm* — Michael Eisenberg

(57) ABSTRACT

A transaction card (smartcard) having a front "continuous" or non-continuous metal layer (ML, CML, DML) with a module opening (MO) for a dual-interface transponder chip module (TCM). Coating polyurethane resin may be used to replace (in lieu of) adhesive film layers and plastic slugs, and to fill module openings, cut-outs and voids in a metal transaction card. The amplifying element (BAC) and magnetic shielding layer may be encapsulated in a polyurethane resin. The resin may further fill and seal the module opening in the front face continuous metal layer and any voids or recesses in subsequent layers. The resin may fill and seal any discontinuity or opening in the rear discontinuous metal layer. The dual interface chip module may be implanted in a milled-out cavity in the polyurethane resin. Removed metal sections may also be encased in polyurethane resin.

20 Claims, 14 Drawing Sheets

RFID ENABLED METAL TRANSACTION CARDS

CROSS-REFERENCES TO RELATED APPLICATIONS

The present application claims the benefit of U.S. provisional application Ser. No. 63/222,957 filed 17 Jul. 2021 and is a continuation-in-part of U.S. Ser. No. 17/857,912 filed 5 Jul. 2022, and a continuation-in-part of U.S. Ser. No. 17/839,521 filed 14 Jun. 2022 which are each incorporated herein by reference in their entirety.

FIELD OF THE INVENTION

This invention relates to the field of metal transaction cards (smartcards) and, more particularly, passive RFID-enabled metal transaction cards having at least one metal layer and operating in contactless mode from at least one side of the card body.

Some of the disclosure(s) herein may relate to RFID-enabled metal transaction cards having a contactless interface only.

Some of the disclosure(s) herein may relate to metal transaction cards having a fingerprint sensor or a dynamic display.

Some of the disclosure(s) herein may relate to transaction cards made from a material other than metal.

BACKGROUND

There is a growing market demand to have transaction cards with one or several layers of metal. A metal layer provides a desirable weight over conventional plastic cards, and a decorative pattern and/or a reflective metal surface enhances the card's appearance and aesthetic value. This is especially desirable for payment by affluent bank customers. It is therefore desirable to produce dual interface smartcards having a metal layer which operates in contact, but also in contactless mode.

However, a metal layer in a card body construction interferes with the electromagnetic field generated by a contactless reader or terminal thus attenuating the radio-frequency (RF) communication signal between the passive transaction card and the transceiver (transmitter/receiver, reader or terminal).

The prior art suggests using a booster antenna for contactless communication, and a ferrite layer to offset the effects of electromagnetic shielding caused by the metal. Integrating a wire embedded antenna, a ferrite layer and adhesive layers into the card construction significantly impedes upon having a dual interface metal transaction card which has significant weight and a highly sophisticated appearance.

An example of a smartcard with contactless (or dual interface) capability, and having a metal layer and a ferrite layer may be found in US 2013/0126622 (204, FIG. 2A).

An example of a smartcard with contactless (or dual interface) capability, and having a metal layer with a slit in the metal layer may be found in U.S. Pat. No. 9,475,086.

Some Patents and Publications of Interest

The following patents and/or publications ("references") may be of interest or relevant to the invention(s) disclosed herein, and some commentary may be provided to distinguish the invention(s) disclosed herein from the following references.

U.S. Pat. No. 9,836,684 (5 Dec. 2017; Finn et al.), incorporated by reference herein, discloses smart cards, payment objects and methods. Smartcards having (i) a metal card body (MCB) with a slit (S) overlapping a module antenna (MA) of a chip module (TCM) or (ii) multiple metal layers (M1, M2, M3) each having a slit (S1, S2, S3) offset or oriented differently than each other. A front metal layer may be continuous (no slit), and may be shielded from underlying metal layers by a shielding layer (SL). Metal backing inserts (MBI) reinforcing the slit(s) may also have a slit (S2) overlapping the module antenna. Diamond like coating filling the slit. Key fobs similarly fabricated. Plastic-Metal-Plastic smart cards and methods of manufacture are disclosed. Such cards may be contactless only, contact only, or may be dual-interface (contact and contactless) cards.

Shielded Laminated Smartcard

FIG. 16B of U.S. Pat. No. 9,836,684 shows a shielded, laminated metal laminated shielded card (SC) 1600B having two coupling frame metal layers and a front face (ML1) which is a continuous metal layer (no slit). Some of the metal layers are the same (or similar) to those shown in the construction of FIG. 16A. Notably different, however, is that the top metal layer (ML1) does not have a slit (there is no "S1" in this embodiment). The second metal layer (ML2) has a slit (S2), and the third metal layer (ML3) has a slit (S3), as in the construction of FIG. 16A, and the various layers may be held together (laminated) with layers of adhesive, as shown. The dimensions of the various layers may be similar to those in the construction of FIG. 16A.

The front face (ML1) 1620A, as shown, does not have a slit, and may interact with the reader electromagnetic field and produce induced eddy currents within its body. These eddy currents will normally produce a counter-field resulting in reduction or blocking of the communication between the transponder chip module and reader. To offset this, a shielding layer (SL) 1640 of suitably chosen magnetic material may be placed between the front continuous metal layer and the coupling frame layers (ML2, ML3) of the card. A layer of adhesive 1622 having a thickness of 20 μm may be disposed between the front metal layer ML1 and the shielding layer SL. A layer of adhesive 1623 having a thickness of 20 μm may be disposed between the shielding layer SL and the second metal layer ML2.

The front metal layer (ML1) may have a thickness of 200 μm, rather than 300 μm (or 320 μm) as in the construction of FIG. 16A. The shielding layer (SL) may have a thickness of approximately 50-200 μm, such as 100 μm (which was gained by making the front layer thinner than in the construction of FIG. 16A). In this manner the coupling frames will be shielded from the attenuating front metal layer and continue to function in conjunction with the transponder chip module (TCM).

Other elements of the FIG. 16B embodiment, such as the second metal layer ML2 and third metal layer ML3 may be substantially similar or identical to corresponding (similarly numbered) elements in the embodiment of FIG. 16A. Generally, the top metal layer ML1 of FIG. 16A is replaced by a metal layer ML1 without a slit and a shielding layer SL. The module antenna (MA) of the transponder chip module (TCM) may reside in a plane that lies below the continuous front metal layer (ML1). The module antenna (MA) may be surrounded on all edges (sides) by magnetic shielding material (not shown) to reduce the attenuation from eddy currents in the front metal layer (ML1). In this manner the performance of the magnetic shielding material may be maximized and the coupling of the transponder chip module (TCM) with the coupling frame layers (ML2, ML3) may be improved.

U.S. Pat. No. 11,315,002 (26 Apr. 2022; CompoSecure; Lowe et al.), entitled "Transaction card with embedded electronic components and process for manufacture", incorporated by reference herein, discloses a process for making a transaction card defined by a plurality of layers is described. The process includes providing a first portion of the card, the first portion comprising a non-plastic layer having first and second faces and a thickness therebetween; forming an opening in the non-plastic layer, the opening defined through the first face; disposing embedded electronics in the opening; providing a second portion of the card; and providing a fill disposed in portions of the opening not occupied by the embedded electronics and attaching the first portion of the card to the second portion of the card.

Claim 1 of U.S. Pat. No. 11,315,002:

A process for making a transaction card defined by a plurality of layers, the process comprising the steps of: providing a first portion of the card, the first portion comprising a non-plastic layer having first and second faces and a thickness therebetween; forming an opening in the non-plastic layer, the opening defined through the first face; disposing embedded electronics in the opening; providing a second portion of the card; providing a fill disposed in portions of the opening not occupied by the embedded electronics and attaching the first portion of the card to the second portion of the card; and wherein the step of providing the fill and attaching the first portion to the second portion of the card comprises the substeps of: providing a transfer tape comprising unsupported adhesive disposed between a first release layer and a second release layer; removing the first release layer and attaching the adhesive to one of (i) the second portion of the card, and (ii) the first face and the embedded electronics; and removing the second release layer and attaching the adhesive to the other of (i) the second portion of the card, and (ii) the first face and the embedded electronics.

Claim 2 of U.S. Pat. No. 11,315,002:

The process of claim 1, further comprising tacking the electronics in the opening before disposing the fill in the opening.

U.S. Pat. No. 11,267,172 (8 Mar. 2022; CompoSecure; Lowe), entitled "Overmolded electronic components for transaction cards and methods of making thereof", incorporated by reference herein, discloses a process for manufacturing a transaction card includes forming an opening in a card body of the transaction card; inserting an electronic component into the opening; and molding a molding material about the electronic component. A transaction card includes a molded electronic component.

Claim 1 of U.S. Pat. No. 11,267,172:

A process for manufacturing a transaction card comprising the steps of: forming an opening in a card body of the transaction card; inserting an electronic component into the opening; and molding a molding material about the electronic component; wherein the molding step comprises placing the electronic component into a mold and injecting the molding material into the mold, and wherein the inserting step occurs after the molding step.

Claim 6 of U.S. Pat. No. 11,267,172:

The process of claim 1, wherein the molding material comprises a polymeric molding material, the polymeric molding material comprising one or more of EVA, metallocene polyalphaolefins, poly olefins including atactic polyalphaolefins, block copolymers, polyurethane hot melts, polyamides, fiberglass reinforced polyester, polyurethane, bakelite, duroplast, melamine, Diallyl-phthalate, and polyimide.

U.S. Pat. No. 10,583,594 (10 Mar. 2020; CompoSecure; Lowe), entitled "Overmolded electronic components for transaction cards and methods of making thereof", incorporated by reference herein, discloses a process for manufacturing a transaction card includes forming an opening in a card body of the transaction card; inserting an electronic component into the opening; and molding a molding material about the electronic component. A transaction card includes a molded electronic component.

Claim 1 of U.S. Pat. No. 10,583,594:

A process for manufacturing a transaction card comprising the steps of: forming an opening in a metal card body of the transaction card, the metal card body having a color; and molding a molding material about an electronic component by first inserting the electronic component into the opening and then filling the opening with the molding material, wherein the molding material has a color and tone selected to match the color of the body.

U.S. Pat. No. 10,406,734 (10 Sep. 2019; CompoSecure; Lowe), entitled "Overmolded electronic components for transaction cards and methods of making thereof", incorporated by reference herein, discloses a process for manufacturing a transaction card includes forming an opening in a card body of the transaction card; inserting an electronic component into the opening; and molding a molding material about the electronic component. A transaction card includes a molded electronic component.

Claim 1 of U.S. Pat. No. 10,406,734:

A process for manufacturing a transaction card comprising the steps of: (a) forming an opening in a card body of the transaction card, including at least a first securing feature as a blind hole pocket open only to a first face of the card body and at least a second securing feature as a blind hole pocket open only to a second face of the card body; (b) molding a molding material about an electronic component by placing the electronic component in a mold and adding the molding material to completely encapsulate the component; and then, after performance of steps (a) and (b), inserting and securing the completely encapsulated electronic component into the opening in the card body, including using the first and second securing features for securing the molding material to the card body.

Claim 4 of U.S. Pat. No. 10,406,734:

The process of claim 1, wherein the molding material is a polymeric material comprising one or more of EVA, metallocene polyalphaolefins, polyolefins including atactic polyalphaolefins, block copolymers, polyurethane hot melts, polyamides, fiberglass reinforced polyester, polyurethane, bakelite, duroplast, melamine, Diallyl-phthalate, and polyimide.

Claim 5 of U.S. Pat. No. 10,406,734:

The process of claim 1, wherein the molding material comprises a resin including powdered metal.

Reference is also made to U.S. Pat. No. 11,247,371 (15 Feb. 2022; CompoSecure; Lowe) and U.S. Pat. No. 10,926,439 (23 Feb. 2021; CompoSecure; Lowe).

U.S. Pat. No. 3,042,545 (3 Jul. 1962; United States Rubber Company; Kienle et al.), entitled "Epoxy Resins as Adhesives for Bonding Polyurethane to Metal", incorporated by reference herein, discloses epoxy adhesives and more particularly to the use of epoxy adhesives to bond urethane polymers to a metal surface.

U.S. Pat. No. 9,390,366 (12 Jul. 2016; CompoSecure; Herslow et al.), entitled "Metal smart card with dual interface capability", discloses a dual interface smart card having a metal layer includes an IC module, with contacts and RF capability, mounted on a plug, formed of non RF impeding material, between the top and bottom surfaces of the metal layer. The plug provides support for the IC module and a degree of electrical insulation and isolation from the metal layer. The resultant card can have contact and contactless operating capability and an entirely smooth external metal surface except for the contacts of the IC module.

U.S. Pat. No. 9,721,200 (1 Aug. 1, 2017; CompoSecure; Herslow et al.), entitled "Card with metal layer and an antenna", discloses in a smart card having an antenna structure and a metal layer, an insulator layer is formed between the antenna structure and the metal layer to compensate for the attenuation due to the metal layer. The thickness of the insulator layer affects the capacitive coupling between the antenna structure and the metal layer and is selected to have a value which optimizes the transmission/reception of signals between the card and a card reader.

U.S. Pat. No. 9,898,699 (20 Feb. 2018; CompoSecure; Herslow et al.), entitled "Smart metal card with radio frequency (RF) transmission capability", discloses ferrite material utilized in a smart metal card as a shield between a metal layer and an antenna does not occupy a complete layer. Instead, only sufficient ferrite material is utilized to track and conform to the antenna.

U.S. Pat. No. 10,089,570 (2 Oct. 2, 2018; CompoSecure; Herslow et al.), entitled "Card with metal layer and an antenna", discloses in a smart card having an antenna structure and a metal layer, an insulator layer is formed between the antenna structure and the metal layer to compensate for the attenuation due to the metal layer. The thickness of the insulator layer affects the capacitive coupling between the antenna structure and the metal layer and is selected to have a value which optimizes the transmission/reception of signals between the card and a card reader.

U.S. Pat. No. 10,275,703 (30 Apr. 2019; CompoSecure; Herslow et al.), entitled "Smart metal card with radio frequency (RF) transmission capability", discloses RF shielding material utilized in a smart metal card as a shield between a metal layer and an antenna does not occupy a complete layer. Instead, only sufficient RF shielding material is utilized to track and conform to the antenna.

U.S. Pat. No. 10,289,944 (14 May 2019; CompoSecure; Herslow et al.), entitled "Metal smart card with dual interface capability", discloses a dual interface smart card having a metal layer includes an SC module, with contacts and RF capability, mounted on a plug, formed of non RF impeding material, between the top and bottom surfaces of the metal layer. The plug provides support for the IC module and a degree of electrical insulation and isolation from the metal layer. The resultant card can have contact and contactless operating capability and an entirely smooth external metal surface except for the contacts of the IC module.

U.S. Pat. No. 10,318,859 (11 Jun. 2019; CompoSecure; Lowe et al.), entitled "Dual interface metal smart card with booster antenna", discloses a card having a metal layer and an opening or cut-out region in the metal layer, with a dual-interface integrated circuit (IC) module disposed in the opening or cut-out region. A ferrite layer is disposed below the metal layer and a booster antenna is attached to the ferrite layer. A vertical hole extends beneath the IC module through the ferrite layer. The booster antenna may be physically connected to the IC module or may be configured to inductively couple to the IC module. In some embodiments, the IC may be disposed in or on a non-conductive plug disposed within the opening or cut-out region, or the vertical hole may have a non-conductive lining, or a connector may be disposed between the booster antenna and the IC module in the vertical hole.

U.S. Pat. No. 10,534,990 (14 Jan. 2020; CompoSecure; Herslow et al.), entitled "Metal smart card with dual interface capability", discloses a dual interface smart card, and methods for the manufacture thereof, having a metal layer, an IC module, with contacts and RF capability, and a plug formed of non-RF impeding material, disposed in the metal layer. The plug provides support for the IC module and a degree of electrical insulation and isolation from the metal layer. Embodiments of the card include at least one additional layer.

U.S. Pat. No. 10,748,049 (18 Aug. 2020; CompoSecure; Herslow et al.), entitled "Metal smart card with dual interface capability", discloses a smart card having a metal layer, an opening in the metal layer and a dual interface integrated circuit (IC) module and a plug non-RF-impeding material mounted in the opening, with at least one at least one additional layer stacked relative to the plug.

US 2020/0364532 (19 Nov. 2020; CompoSecure; Herslow et al.), entitled "Metal smart card with dual interface capability", discloses a transaction card comprising a metal layer. A first cut out region in a first surface of said metal layer has a depth less than the thickness of the metal layer, and a first portion of an integrated circuit (IC) module is secured therein. A second cut out region extends from the first cut out region to the second surface of said metal layer and defines a non-RF-impeding volume having a perimeter greater than the perimeter of the first cut out region. One or more additional layers are stacked on the second surface of the metal layer, and a channel extends between one of the stacked layers and the IC module.

US 2020/0151535 (14 May 2020; CompoSecure; Herslow et al.), entitled "Metal smart card with dual interface capability", discloses a smart card having a metal layer, an opening in the metal layer and a dual interface integrated circuit (IC) module and a plug non-RF-impeding material mounted in the opening, with at least one at least one additional layer stacked relative to the plug.

US 2019/0354825 (21 Nov. 2019; CompoSecure; Lowe), entitled "Metal dual interface card", discloses a dual interface transaction card includes a metal card body having first and second surfaces. A contact-only transaction module is secured in the card body, the contact-only transaction module including contact pads disposed on the first surface of the card body and including a first transaction circuit. A contactless transaction module is secured in a void in the metal card body. The contactless transaction module includes a second transaction circuit and an antenna. Also disclosed is a process for manufacturing the dual interface transaction card. The process includes the steps of constructing a metal card body having the first and second surfaces, securing the contact-only transaction module in the metal card body, forming the void in the metal card body, and securing the contactless transaction module in the void.

Some Additional References

The following patents and/or publications ("references") may be of interest or relevant to the invention(s) disclosed herein, and some commentary may be provided to distinguish the invention(s) disclosed herein from some of the following references.

U.S. Pat. No. 11,068,770 Connection bridges for dual interface transponder chip modules
U.S. Pat. No. 10,599,972 Smartcard constructions and methods
U.S. Pat. No. 10,552,722 Smartcard with coupling frame antenna
U.S. Pat. No. 10,518,518 Smart cards with metal layer(s) and methods of manufacture
U.S. Pat. No. 10,248,902 Coupling frames for RFID devices
U.S. Pat. No. 10,193,211 Smartcards, RFID devices, wearables and methods
U.S. Pat. No. 9,960,476 Smart card constructions
U.S. Pat. No. 9,836,684 Smart cards, payment objects and methods
U.S. Pat. No. 9,812,782 Coupling frames for RFID devices
U.S. Pat. No. 9,798,968 Smartcard with coupling frame and method of increasing activation distance of a transponder chip module
U.S. Pat. No. 9,697,459 Passive smartcards, metal cards, payment objects and smart jewelry
U.S. Pat. No. 9,634,391 RFID transponder chip modules
U.S. Pat. No. 9,622,359 RFID transponder chip modules
U.S. Pat. No. 9,489,613 RFID transponder chip modules with a band of the antenna extending inward
U.S. Pat. No. 9,475,086 Smartcard with coupling frame and method of increasing activation distance of a transponder chip module
U.S. Pat. No. 9,390,364 Transponder chip module with coupling frame on a common substrate for secure and non-secure smartcards and tags
2018/0339503 Smartcards with metal layer(s) and methods of manufacture
2018/0341846 Contactless metal card constructions
2019/0114526 Smartcard constructions and methods
2019/0171923 Metallized smartcard constructions and methods
2019/0197386 Contactless smartcards with multiple coupling frames
2019/0392283 RFID transponder chip modules, elements thereof, and methods
2020/0005114 Dual interface metal hybrid smartcard
2020/0034578 Smartcard with display and energy harvesting
2020/0050914 Connection bridges for dual interface transponder chip modules Now: U.S. Pat. No. 11,068,770
2020/0151534 Smartcards with metal layers and methods of manufacture
2020/0226443 Smartcard with a booster antenna and a wireless connection between modules
2020/0250504 Manufacturing metal inlays for dual interface metal cards
2020/0250506 Smartcard constructions and methods
2020/0257953 Contactless smartcards with coupling frames
2020/0327387 Smartcard with a coupling frame and a wireless connection between modules
2020/0387768 Contactless metal card constructions
2021/0056374 Transponder chip module with module antenna(s) and coupling frame(s)
2021/0056375 Smart cards with metal layer(s) and methods of manufacture
2021/0182650 Smartcards with Multiple Coupling Frames
2021/0192311 Coupling frames for smartcards with various module opening shapes
2021/0192312 Smart Cards with Metal Layer(s) and Methods of Manufacture
2021/0256341 Smart Cards with Metal Layer(s) and Methods of Manufacture
U.S. Pat. No. 11,250,305 (15 Feb. 2022; Finn)
U.S. Pat. No. 11,113,593 (7 Sep. 2021; Finn)
US 2021/0049431 (18 Feb. 2021; Finn)
US 2021/0049439 (18 Feb. 2021; Finn)
US 2021/0073608 (11 Mar. 2021; Finn)
US 2021/0081743 (18 Mar. 2021; Finn et al.)
US 2021/0081748 (18 Feb. 2021; Finn)
US 2021/0110231 (15 Apr. 2021; Finn)
US 2021/0117744 (22 Apr. 2021; Finn et al.)
US 2021/0150294 (20 May 2021; Finn) Now: U.S. Pat. No. 11,341,385 (24 May 2022; Finn)
US 2021/0174159 (10 Jun. 2021; Finn)
US 2021/0216838 (15 Jul. 2021; Finn)
US 2021/0350198 (11 Nov. 2021; Finn)

Some Additional References

U.S. Pat. No. 6,452,563 (17 Sep. 2002; Gemplus aka Gemalto; Porte)
U.S. Pat. No. 6,491,229 (10 Dec. 2002; NJC Innovations; Berney)
U.S. Pat. No. 7,306,163 (11 Dec. 2007; IBM; Scholz et al.)
U.S. Pat. No. 7,701,350 (20 Apr. 2010; Hitachi; Sakama, et al.)
U.S. Pat. No. 8,186,582 (29 May 2012; American Express; Varga et al.)
U.S. Pat. No. 8,393,547 (12 Mar. 2013; Perfect Plastic Printing; Kiekhaefer et al.)
U.S. Pat. No. 8,523,062 (3 Sep. 2013; American Express; Varga et al.)
U.S. Pat. No. 8,608,082 (17 Dec. 2013; Oberthur Technologies, aka IDEMIA; La Garrec et al.)
U.S. Pat. No. 8,725,589 (13 May 2014; JPMorgan Chase; Skelding et al.)
U.S. Pat. No. 8,737,915 (27 May 2014; J. H. Tonnjes E.A.S.T.; Beenken)
U.S. Pat. No. 9,024,763 (5 May 2015; Hamedani Soheil)
U.S. Pat. No. 9,299,020 (29 Mar. 2016; TheCard; Zimmerman et al.)
U.S. Pat. No. 9,390,366 (12 Jul. 2016; CompoSecure; Herslow et al.)
U.S. Pat. No. 9,564,678 (7 Feb. 2017; Murata Manufacturing; Kato et al.)
Reference is also made to U.S. Pat. Nos. 8,976,075, 9,203, 157 and 9,231,305.
U.S. Pat. No. 9,721,200 (1 Aug. 2017; CompoSecure; Herslow et al.)
U.S. Pat. No. 9,760,816 (12 Sep. 2017; American Express; Williams et al.)
U.S. Pat. No. 9,836,687 (5 Dec. 2017; American Express; Williams et al.)
U.S. Pat. No. 9,881,247 (30 Jan. 2018; Le Garrec et al.)
U.S. Pat. No. 9,898,699 (20 Feb. 2018; CompoSecure; Herslow et al.)
U.S. Pat. No. 10,089,570 (2 Oct. 2018; CompoSecure; Herslow et al.)
U.S. Pat. No. 10,140,569 (27 Nov. 2018; Kim et al.)
U.S. Pat. No. 10,275,703 (30 Apr. 2019; CompoSecure; Herslow et al.)
U.S. Pat. No. 10,289,944 (14 May 2019; CompoSecure; Herslow et al.)
U.S. Pat. No. 10,318,859 (11 Jun. 2019; CompoSecure; Lowe, et al.)
U.S. Pat. No. 10,445,636 (15 Oct. 2019; Giesecke & Devrient; Virostek et al.)
U.S. Pat. No. 10,534,990 (14 Jan. 2020; CompoSecure; Herslow et al.)

U.S. Pat. No. 10,583,683 (10 Mar. 2020; Federal Card Services; Ridenour et al.)
U.S. Pat. No. 10,748,049 (18 Aug. 2020; CompoSecure; Herslow et al.)
U.S. Pat. No. 10,885,419 (5 Jan. 2021; CompoSecure; Lowe et al.)
U.S. Pat. No. 11,151,437 (19 Oct. 2021; CompoSecure; Lowe et al.)
U.S. Pat. No. 11,182,662 (23 Nov. 2021; CompoSecure; Lowe)
US 2011/0181486 (28 Jul. 2011; Murata; Kato), reference is also made to US 2011/0186641
US 2012/0112971 (10 May 2012; Panasonic; Takeyama et al.)
US 2013/0126622 (23 May 2013; AmaTech; Finn)
US 2014/0091149 (3 Apr. 2014; Finn et al.)
US 2014/0231503 (21 Aug. 2014; Smart Co.; Kunitaka)
US 2015/0206047 (23 Jul. 2015; CompoSecure; Herslow)
US 2015/0221624 (6 Aug. 2015; Sandisk; Ye et al.)
US 2019/0050706 (14 Feb. 2019; CompoSecure; Lowe) now U.S. Pat. No. 10,406,734
US 2019/0073578 (7 Mar. 2019; CompoSecure; Lowe et al.)
US 2019/0156994 (23 May 2019; X-Card Holdings; Cox)
US 2019/0160717 (30 May 2019; CompoSecure; Lowe)
US 2019/0236434 (1 Aug. 2019; CompoSecure; Lowe)
US 2019/0286961 (19 Sep. 2019; CompoSecure; Lowe)
US 2019/0291316 (26 Sep. 2019; CompoSecure; Lowe) (now U.S. Pat. No. 10,583,594).
US 2019/0311235 (10 Oct. 2019; Giesecke & Devrient; Sexl et al.)
US 2019/0311236 (10 Oct. 2019; Giesecke & Devrient; Sexl et al.)
US 2019/0384261 (19 Dec. 2019; Kona I; Nam et al.)
US 2019/0354825 (21 Nov. 2019; CompoSecure; Lowe)
US 2020/0151535 (14 May 2020; CompoSecure; Herslow et al.) now U.S. Pat. No. 10,748,049
US 2020/0164675 (28 May 2020; FCS; Ridenour et al.)
US 2020/0364531 (19 Nov. 2020; CompoSecure; Lowe et al.)
US 2020/0364532 (19 Nov. 2020; CompoSecure; Herslow et al.)
US 2021/0073606 (11 Mar. 2021; CompoSecure; Lowe et al.)
US 2021/0073607 (11 Mar. 2021; CompoSecure; Lowe et al.)
US 2021/0154898 (27 May 2021; CompoSecure; Lowe et al.)
US 2021/0158124 (27 May 2021; CompoSecure; Lowe et al.)
US 2021/0209437 (8 Jul. 2021; CompoSecure; Lowe et al.)
US 2021/0232887 (29 Jul. 2021; Ritter)
US 2022/0058457 (24 Feb. 2022; Thales; Meridiano et al.)
Chen, S. L., Kuo, S. K. and Lin C. T. (2009) incorporated by reference herein, discloses "A metallic RFID tag design for steel-bar and wire-rod management application in the steel industry" (Progress in Electromagnetics Research, PIER Vol. 91: pp. 195-212.)
EP 0 494 471 (1 Jan. 1992; Chubb Lips; Nieuwkoop)
JP 4016322 (5 Dec. 2007; FEC; Takeda)
EP 2372840 (25 Sep. 2013; Panasonic; Hashimoto) including US 2011/0227799
U.S. Pat. No. 8,665,069 (4 Mar. 2014; Petratec; Weitzhandler et al.)
CN 205158409U (13 Apr. 2016)
WO 2017/090891 (1 Jun. 2017; Biosmart; Yoon et al.)
KR 10-1754985 (30 Jun. 2017; Aichi CK Corporation aka ICK; Kim et al.)
PCT/US2019/020919 (12 Sep. 2019; X-Card Holding; Cox)
US 2004/0118930 (24 Jun. 2004; American Express; Berardi et al.)
US 2019/0114526 (18 Apr. 2019; Finn et al.)
US 2019/0171923 (6 Jun. 2019; Finn)
US 2016/0180212 (23 Jun. 2016; Herslow et al)
WO 2017/162311 (28 Sep. 2017; Zwipe AS)
WO 2017/177905 (19 Oct. 2017; Hightec Tech)
WO 2018/132404 (19 Jul. 2018; CompoSecure, LLC)
U.S. Pat. No. 3,214,324 (26 Oct. 1965; General Mills; Peerman)
U.S. Pat. No. 6,329,958 (11 Dec. 2001; TDK; McLean et al.)
U.S. Pat. No. 6,817,085 (16 Nov. 2004; TDK; Uchikoba et al.)
U.S. Pat. No. 7,948,057 (24 May 2011; TDK; Furukawa et al.)
U.S. Pat. No. 8,158,018 (17 Apr. 2012; TDK, Nakahata et al.)
U.S. Pat. No. 9,673,506 (6 Jun. 2017; TDK; Asou et al.)
US 2017/0271746 (21 Sep. 2017; TDK; Komachi et al.)

Some Additional References

The following references may also be applicable to the invention(s) disclosed herein:
U.S. Pat. Nos. 6,581,839, 6,749,123, 6,764,014, 7,306,158, 7,377,443, 7,607,583, 7,837,116, 8,066,190, 8,186,598, 7,494,057, 7,530,491, 7,819,310, 7,823,777, 7,971,786, 8,033,457, 8,079,514, 8,186,582, 8,523,062, 9,760,816, 9,836,687
U.S. D879,196, U.S. D942,538 and U.S. Pat. No. 943,024

Some Definitions

Some of the following terms may be used or referred to, herein.

Eddy Currents

Eddy currents are induced electrical currents that flow in a circular path. In other words, they are closed loops of induced current circulating in planes perpendicular to the magnetic flux. Eddy currents concentrate near the surface adjacent to the excitation coil of the contactless reader generating the electromagnetic field, and their strength decreases with distance from the transmitter coil. Eddy current density decreases exponentially with depth. This phenomenon is known as the skin effect. The depth that eddy currents penetrate into a metal object is affected by the frequency of the excitation current and the electrical conductivity and magnetic permeability of the metal.

Skin Depth

Skin effect is the tendency of an alternating electric current (AC) to become distributed within a conductor such that the current density is largest near the surface of the conductor, and decreases with greater depths in the conductor. The electric current flows mainly at the "skin" of the conductor, between the outer surface and a level called the skin depth. The skin effect causes the effective resistance of the conductor to increase at higher frequencies where the skin depth is smaller, thus reducing the effective cross-section of the conductor. The skin effect is due to opposing eddy currents induced by the changing magnetic field resulting from the alternating current.

Eddy Currents and a Slit in a Metal Layer or Metal Card Body

A discontinuity interrupts or alters the amplitude and pattern of the eddy currents which result from the induced electromagnetic field generated by a contactless point of sale terminal. The eddy current density is highest near the surface of the metal layer (ML) and decreases exponentially with depth.

RFID Slit Technology

Providing a metal layer in a stack-up of a card body, or an entire metal card body, to have a module opening (MO) for receiving a transponder chip module (TCM) and a slit (S) to effectuate contactless communication with the card—in other words, a "coupling frame"—may be described in greater detail in U.S. Pat. Nos. 9,475,086, 9,798,968, and in some other patents that may be mentioned herein. In some cases, a coupling frame (CF) may be formed from a metal layer (ML) or metal card body (MCB) having a slit (S), without having a module opening (MO). A typical slit may have a width of approximately 100 µm. As may be used herein, a "micro-slit" refers to a slit having a smaller width, such as approximately 50 µm, or less.

"RFID Slit Technology" refers to modifying a metal layer (ML) or a metal card body (MCB) into a so-called "antenna circuit" by providing a discontinuity in the form of a slit, slot or gap in the metal layer (ML) or metal card body (MCB) which extends from a peripheral edge to an inner area or opening of the layer or card body. The concentration of surface current at the inner area or opening can be picked up by another antenna (such as a module antenna) or antenna circuit by means of inductive coupling which can drive an electronic circuit such as an RFID chip attached directly or indirectly thereto. The slit may be ultra-fine (typically less than 50 µm or less than 100 µm), cut entirely through the metal with an IR laser, with the debris from the plume removed by ultrasonic or plasma cleaning. Without a cleaning step after lasing, the contamination may lead to shorting across the slit. In addition, the slit may be filled with a dielectric to avoid such shorting during flexing of the metal forming the transaction card. The laser-cut slit may be further reinforced with the same filler such as a resin, epoxy, mold material, repair liquid or sealant applied and allowed to cure to a hardened or flexible state. The filler may be dispensed or injection molded. The term "slit technology" may also refer to a "coupling frame" with the aforementioned slit, or to a smartcard embodying the slit technology or having a coupling frame incorporated therein.

Coupling Frame

Generally, a "coupling frame" (CF) may comprise a metal layer, metal frame, metal plate or any electrically-conductive medium or surface with an electrical discontinuity such as in the form of a slit (S) extending from an outer edge of the layer to an inner position thereof, the coupling frame (CF) capable of being oriented so that the slit (S) overlaps (crosses-over) the module antenna (MA) of the transponder chip module (TCM), such as on at least one side thereof. The slit (S) may be straight and may have a width and a length. The slit (S) may extend to an opening (MO) for accepting the transponder chip module. There may only be a slit, and no opening for the transponder chip module (TCM). Coupling frames of this type, typically a layer of metal with an opening for receiving a transponder chip module, and a slit extending from a periphery of the layer to the opening, wherein the slit overlaps at least a portion of the module antenna, may be found in the following U.S. Pat. Nos. 9,812,782; 9,390,364; 9,634,391; 9,798,968 and 9,475,086.

Module Antenna (MA)

This is an antenna structure (AS) located on the face-down-side of a transponder chip module (TCM) or dual interface chip module (DI chip module) for inductive coupling with an in-card booster antenna (BA) or coupling frame (CF). The antenna structure (AS) is usually rectangular in shape with dimensions confined to the size of the module package having 6 or 8 contact pads on the face-up-side. The termination ends of the antenna structure (AS) with multiple windings (e.g. 13 to 15 turns depending on the input capacitance of the RFID chip) based on a frequency of interest (e.g. 13.56 MHz) are bonded to the connection pads ($L_A$ and $L_B$) on the RFID chip. In the case of a coupling frame (CF) smartcard such as a dual interface metal core transaction card, the module antenna (MA) overlaps the coupling frame or metal layer(s) within the card body at the area of the module opening to accept the transponder chip module (TCM).

Booster Antenna

A booster antenna (BA) in a smartcard comprises a card antenna (CA) component with multiple turns or windings extending around the periphery edge of the card body (CB), a coupler coil (CC) component at a location for a module antenna (MA) of a transponder chip module (TCM), and an extension antenna (EA) component contributing to the inductance and tuning of the booster antenna (BA). A conventional booster antenna is a wire embedded antenna, ultrasonically scribed into a synthetic layer forming part of the stack-up construction of a dual interface smartcard. The card antenna (CA) on the periphery of the card body (CB) inductively couples with the contactless reader while the coupler coil (CC) inductively couples with the module antenna (MA) driving the RFID chip. US 2014/0091149 (3 Apr. 2014; Finn et al.) provides an example of a booster antenna (BA) for a smart card.

Coupling Frame Antenna (CFA)

A metal layer or metal card body with a discontinuity may be represented by card size planar antenna having a single turn, with the width of the antenna track significantly greater than the skin depth at the frequency of interest.

Compensating Loop (CL)

To stabilize the resonance frequency of a booster antenna (BA), a metal compensating loop (CL) with a gap may be assembled underneath the booster antenna BA. A ferrite layer or layers may also be laminated together, in combination with the compensating loop CL on the reverse side of the booster antenna BA. Reference is made to US 2013/0126622 (FIG. 4A).

Discontinuous Metal Frame (DMF)

It is an "open loop" metal frame (DMF) disposed around a peripheral area of a card body with a booster antenna (BA) disposed inside the internal area of the metal frame. The "open loop" metal frame may comprise a slit (S) or gap which may extend from an inner edge to an outer edge of the metal frame, and the booster antenna (BA) disposed inside the internal area of the metal frame. The gap may provide a means for tuning the resonant frequency of the booster antenna. Insulating layers may be disposed on at least one side of the metal frame, covering the slit (S), and may comprise a dielectric medium such as an oxide layer. Reference is made to US 2015/0269477 (FIG. 2H).

Metal Edge and Metal Ledge in a Continuous Metal Layer/Booster Antenna Circuit/Coupling Frame Constellation For optimum radio frequency (RF) performance of a metal transaction card with an embedded dual interface transponder chip module (TCM) or an inductive coupling chip module (ICM) with a module antenna (MA) connected to an RFID chip, having an in-card booster antenna circuit (BAC) with a card antenna (CA) component with multiple windings extending around the perimeter edge of the card body (CB) and a coupler coil (CC) component with multiple windings located at an area destined for the transponder chip module (TCM), with the in-card booster antenna circuit (BAC) residing on a magnetic shielding layer sandwiched between a front face metal layer without a slit (continuous metal layer) and a rear metal layer acting as a card body coupling frame (CF) with a slit (S) and a module opening (MO) (discontinuous metal layer), the proximity and overlap of the antenna structures (AS) of the transponder chip module (TCM), booster antenna circuit (BAC) and coupling frame (CF), to the metal edges of the metal card body (MCB) and the metal ledges within the metal card body (MCB) become critical in maximizing the harvesting of the surface currents to drive the RFID chip.

The proximity in terms of spatial distance of the card antenna (CA) component of the booster antenna circuit (BAC) to the metal edge of the card body coupling frame (CF), the discontinuous metal layer with a slit (S) and module opening (MO), plays a significant role in capturing surface currents flowing around the metal edges of the card body (CB) and directing them to the coupler coil (CC) component for inductive coupling with the module antenna (MA) of the transponder chip module (TCM). As the surface currents decay with distance away from the metal edges to the inner area of the coupling frame (CF) because of the skin effect, the card antenna (CA) component with multiple windings has to be routed as near as possible to the perimeter edge of the metal card body (i.e. coupling frame). Notably, there are negligible surface current flows in the center of the coupling frame (CF), because of the exponential decay resulting from the skin effect.

The dimensional width of the windings (or the width across multiple windings) of the coupler coil (CC) component of a booster antenna circuit (BAC) ought to overlap a metal ledge in the module opening (MO) of the coupling frame (CF) by approximately 50% to maximize the pick-up of surface currents. Simultaneously, the windings of the coupler coil (CC) component ought to overlap the windings of the module antenna (MA) of the transponder chip module (TCM) by approximately 50% to optimize inductive coupling.

The same applies to the windings of the module antenna (MA) of the transponder chip module (TCM) which ought to overlap the metal ledge in the module opening (MO) of the coupling frame (CF) by approximately 50% to capture the surface currents. In other words, the dimensional width of the windings of the module antenna (MA) ought to overlap the metal ledge ($P_1$) of the stepped cavity forming the module pocket in a metal transaction card body by approximately 50%. As the shape and form of the antennas may change, the dimensional width of the windings may be replaced by a surface area or operating field volume calculation.

The booster antenna circuit (BAC) components may reside on a single side or on both sides of a dielectric or carrier layer. The antenna structures (AS) may be layered, for example the windings of the card antenna (CA) may be layered on top of each other at the perimeter edges of the card body (CB) to increase the density of the antenna windings in proximity to the metal edges. The layered antenna may have counter windings to tune the resonance frequency and reactive elements (inductance and capacitance). Capacitive features like parallel plates may be integrated into the circuitry using vertical interconnects and jumpers for electrical interconnection of the antenna components. Further, the booster antenna circuit (BAC) may include an extension antenna (EA) or a coupling frame antenna (CFA) component.

Booster Antenna with a Perimeter Coil (Aka Harvesting Coil), Coupler Coil and Secondary Coil(s)

The perimeter coil runs along the outer edge of the metal card body to pick-up surface currents to drive the transponder chip module via the coupler coil by means of inductive coupling. The perimeter coil follows the edges or ledges of the metal layer or layers which form the metal card body, and its path may overlap a boundary interface between a conductive (metal) and non-conductive (plastic) surface located within the card body construction. This may apply when the front face metal layer is continuous and extends edge to edge on all sides of the rectangular card body, while the rear metal layer is continuous or discontinuous but does not extend to all four sides of the card body. The rear metal layer may have a shaped cut-out segment(s) in the metal creating a boundary interface between the conductive metal layer and a non-conductive plastic layer, with the perimeter coil following the contour of the metal. The secondary coil has a range of functions including tuning, additional power generation, picking up surface currents at the metal edges and inner locations of the card body, coupling to other components such as to a biometric sensor, and customized to drive sound, light and display devices. The coupler coil connected to the perimeter coil and the secondary coil(s) overlaps the module antenna of the transponder chip module.

Urethane Casting

Urethane casting uses silicone molds to produce plastic and rubber components using two-component polyurethane resins under a vacuum. Also known as vacuum casting or polyurethane casting, it is a versatile manufacturing technology capable of producing complicated engineering parts in polyurethane resins and cast nylon by simulating injection molding. Because the process takes place inside a vacuum chamber, it creates high-quality bubble-free casting with a smooth surface texture and no defects. Urethane resins are also available to make entirely opaque, translucent, or transparent cast parts.

Urethane Casting vs Injection Molding

Urethane casting and injection molding are similar processes that can create identical plastic parts using similar materials. However, in contrast to urethane casting, which relies on gravity to fill the molds, injection molding employs a pressured nozzle to push the molten plastic into the mold cavity.

Casting Polyester Resin

In its liquid form, casting polyester resin has a consistency of corn syrup and a slight color ranging from straw to light aqua. During the hardening process the slight color bleaches out and the resin becomes crystal clear.

Added to liquid casting resin, catalyst (hardener) produces a chemical reaction, which generates heat, causing the resin to harden.

Coating of Metal

A coating, such as polyurethane resin, is a covering that is applied to the surface of a substrate such as a metal layer, a metal inlay, a metal frame or a metal chassis. The purpose of applying the coating may be to fill voids or recesses in the substrate, to encapsulate the substrate, and or to encase any components or devices assembled thereto.

Functional coatings may be applied to change the surface properties of the substrate, such as the acoustic properties of the substrate, mechanical robustness of the substrate, electrical isolation of the substrate, radio frequency response of components and devices assembled to the substrate, protection of the surface of the substrate from environmental conditions, and to fill and cover voids, recesses, cavities and openings in the substrate, with the coating forming an essential part of the finished product.

A major consideration for most coating processes is that the coating is to be applied at a controlled thickness. After applying the coating, a compression step (under vacuum) may be implemented to extract any air pockets or release of gases. After contraction and curing of the coating over a long duration, the solidified coating may be mechanically planed to a certain thickness.

An adhesion promoter such as a primer (chemical bonding agent) or a single layer of thermosetting adhesive film may be applied to the substrate, before coating the substrate. An adhesion promoter encourages the subsequent coating to adhere well.

Adhesion Promoter

A primer in the form of a chemical bonding agent is a low viscous liquid (e.g. 30 mPa·s) for the pre-treatment of metal surfaces to promote the adhesion of polyurethane thereto. Adhesion can be further improved with surface treatment such as sanding, ultrasonic cleaning, blasting and chemical activation or combinations of these before applying the primer. The primer is applied in a single coat to the metal surface by spraying, dipping or coating. Ideally, the film thickness of the primer is very thin (5 μm to 15 μm).

A typical primer is comprised of film-forming polymers, cross-linkable resins, fillers, and a solvent or water-based carrier system.

Two-coat adhesive formulations for coating polyurethane to metal may comprise of a primer layer and an adhesive topcoat. The primer provides a means of obtaining robust adhesion to the metal substrate such as stainless steel while providing the necessary reactivity with the adhesive topcoat for bonding to polyurethane.

Polyurethane Resin

The compound consists of a resin component based on a polyol and the hardener isocyanate (MDI).

Roll Coating System

A roll coating system coats an adhesive (single or 2-component adhesive) such as a polyurethane resin for all-over coating of a substrate and parts with irregular shapes. A roll coating system typically has an adhesive reservoir, a coating drum, a doctor blade and a conveyor roller, with the width of the drum dictating the width of the coating being applied to the substrate. In order, to avoid adhesive spillage during application, the substrate may be larger than the start and stop positions of the coating. A sacrificial layer may be applied to one side of the substrate for protection, and should the substrate have any apertures, openings or windows.

Slot Die Coating

Slot coating is a high-precision coating method used to deposit a thin liquid film onto a moving substrate. It is a pre-metered coating method, where film thickness is directly controlled by the flow rate and web speed. Slot die coating may also be referred to as "slot nozzle coating".

The liquid flow in the application region, so called the coating bead, is strongly affected by operating parameters, liquid properties, and design parameters, such as web speed, surface tension, and geometry of the coating die.

Slot die coating technology is an alternative process to roll coating.

Lapping Cured Polyurethane Resin

There are several methods to horizontally lap cured thermosetting polyurethane resin bonded to a metal layer such as stainless steel, to reduce the thickness of the PU, and to accomplish ultra-high precision geometries. Planing is a machining process that uses linear relative motion between a workpiece (e.g., PU coated metal inlay) and a single point cutting tool, to generate an accurate flat surface. Grinding (abrasive cutting) uses a grinding wheel as cutting tool. Lapping is a machining process in which two surfaces are rubbed together with an abrasive between them.

Continuous Metal Layer Acting as a Coupling Frame

FIG. 7 of US 2021/0049431 shows a front view of a metal-containing smartcard 700 having a portion of the card body (CB) made of a transparent or transparent or translucent material 720 while the rest of the card body is made of two metal pieces 710 & 730. The transponder chip module 702 may be implanted in the card body in the area interfacing the transparent material 720 and metal 710—i.e., overlapping the boundary 718.

The metal containing smartcard 700 comprises: 702 transponder chip module (TCM); 710, 730 metal sections; 720 transparent or translucent material; and 718 boundary (interface) between the metal piece 710 and the transparent material 720. The line 718 indicates the boundary between the non-metallic material 720 and the metallic material 710, and represents a metal edge (ME) of the metallic portion 710 which can function like a slit (S), in that eddy currents will be present from which energy can be harvested by a module antenna (MA) or patch antenna (PA) overlying the metal edge (ME).

The embedded transponder chip module 702 with its module antenna (MA) connected to an RFID chip picks-up surface currents at this interfacing juncture (718) between the transparent material 720 and the metal 710. The metal may have a slit or notch (not shown), a discontinuity in the metal, to allow for surface current concentration. The channel or recess in the metal (such as stainless steel) to accept a magnetic stripe 703 may be mechanically milled or chemically etched. The latter process avoids magnetization of the metal normally caused by milling.

For the purpose of clarity, the non-conducting material interfacing the conductive material may be extruded plastic, injected molded plastic, laminated plastic or any non-conductive material such as wood, ceramic, precious stone, etc., while the conductive material may be any sort of metal, metal mesh, metal grid or any conductive material or a conductive composite comprising metal filings, metal fiber or conductive nanomaterials.

SUMMARY

The invention may relate to innovations in or improvements to RFID-enabled metal-containing transaction cards.

The invention may relate to some improvements in the manufacturing, performance and/or appearance of smartcards (also known as transaction cards), such as metal transaction cards and, more particularly, to RFID-enabled smartcards (which may be referred to herein simply as "cards") having at least contactless capability, including dual interface (contactless and contact) smartcards, including cards having a metal layer in the stack-up of their card body, and including cards having a card body which is substantially entirely formed of metal (i.e., a metal card body).

The invention may relate to innovations in or improvements to RFID-enabled ("contactless capable) metal smartcards or metal transaction cards with/having a metal inlay forming a metal card body, and various stack-up constructions.

The smartcards (transaction cards) disclosed herein may be "one-sided", in that they may only operate in contactless mode when the back (rear) side of the card is presented to an external reader, such as a contactless POS (point of sale)

terminal. The front of the card has a continuous metal layer (CML), without a slit, and therefore cannot function well in contactless mode. A shielding layer and an amplifying element may be disposed behind the front metal layer to enable contactless functionality when the back side of the card is presented to the reader. The amplifying element may essentially be a booster antenna, or booster antenna circuit.

If the front metal layer is a discontinuous metal layer (DML), with a slit, the card may operate in contactless mode when the front side of the card is presented to an external reader, such as a contactless POS (point of sale) terminal.

It is an object of the invention to produce an RFID-enabled metal transaction card comprising a front face metal layer without a slit accompanied by a rear synthetic layer, operating in contactless mode from the rear side of the card body with an activation distance greater than (or at least) 4 cm.

It is an object of the invention to produce an RFID-enabled metal transaction card having a metallic sound (sometimes referred to as "drop acoustics").

It is an object of the invention to integrate an edge-to-edge metal layer into the rear layers of the card body which does not have a slit but functions as a coupling frame, while at the same time providing enhanced rigidity to the card construction.

It is an object of the invention to produce a robust metal transaction card having a front face continuous metal layer 530 (without slit) and a rear face discontinuous metal layer 550 (with at least one straight or shaped slit 520 terminating in a module opening 514) to function as a coupling frame, with the metal layers sandwiching a magnetic shielding layer 542 and a perimeter coil circuit 544 (without a coupler coil). The perimeter coil circuit 544 having antenna tracks 544A which cross, overlap or pass within at least one of the straight or shaped slits 520 (in a direction parallel, perpendicular or a combination thereof to the orientation of the slit(s)) and with the wire ends 544C of the perimeter coil circuit 544 galvanically connected to termination points on the bond side of a dual interface chip module (CM) 510 (a wire bonded or a flip chip package). These termination points are further connected within the chip module package to the antenna connection pads ($L_a$ and $L_b$) on the RFID die. The perimeter coil 544A may have antenna tracks which are routed around the outer edges of the rear face discontinuous metal layer 550 to harvest energy from the electromagnetic field, with the antenna tracks widening at the position of the straight or shaped slit and extending to an opening 514 in the rear face discontinuous metal layer to collect surface currents at the metal edges of the slit 520 and opening 514 or to collect surface currents from within the slit 520 and opening 514, or a combination of both.

It is an object of the invention to produce a robust metal transaction card having a front face continuous metal layer (without slit) and a rear face continuous metal layer (without slit), with the metal layers sandwiching a magnetic shielding layer and a booster antenna circuit having a perimeter coil (aka harvesting coil), a secondary coil(s) and a coupler coil. The contactless functionality of the transaction card operates from the rear side of the metal card body. The shape of the rear face continuous metal layer without a slit may have a cut-out in its rectangular structure which creates a conductive/non-conductive interface between the metal edge of the cut-out, and a plastic insert which is used to fill the void in the metal. The rear metal layer may have several cut-out locations to regulate the position of maximum field intensity.

To enhance RF performance, the module antenna of the transponder chip module, the coupler coil of the booster antenna circuit and the metal edge of the cut-out following the path of the antenna elements (perimeter and secondary coils) in the continuous metal layer overlap each other and are aligned concentrically to one another.

The perimeter coil with multiple turns is routed along the edge of the rear continuous metal layer to pick up surface currents to power the dual interface chip module via the coupler coil by means of inductive coupling. To further enhance the RF performance in terms of activation distance, the rear continuous metal layer without a slit has a shaped cut-out to overlap the area for accepting the transponder chip module and to follow the contour of the module antenna, and may be accommodated by at least one additional cut-out arranged on the opposite side of the metal card body.

The rear continuous metal layer may be sized slightly smaller than the ISO dimensions of a smartcard, allowing the perimeter coil to run along and overlap the metal edges or ledges of the rear continuous metal layer. This practice may also be applicable to a discontinuous metal layer.

According to the invention, generally, a transaction card (SC: smartcard) having a front "continuous" (with no slit) metal layer (330) with an opening (MO: 312) for a dual-interface transponder chip module (310) having a module antenna (311) on its bond side (not shown).

A magnetic shielding layer (342) comprising ferrite or non-ferrite material disposed below the front face continuous metal layer.

An amplifying element (or booster antenna circuit (BAC) (344) may be disposed under the magnetic shielding layer. A rear continuous metal layer (350) without a slit having at least one shaped cut-out (314A) and a metal ledge (316A) following the contour of the cut-out (CO: 314A) to function as a coupling frame (CF). At least one of the shaped cut-out segments may have a metal ledge or with a slit (S) extending to the module opening (MO) to function as a coupling frame (CF).

A rear plastic layer (360) formed of non-RF impeding material may capture a magnetic stripe and security elements (signature panel and hologram). Optionally, a portion of the front face continuous metal layer may protrude downward into the magnetic shielding layer and booster antenna circuit layer. The rear continuous metal layer may have an additional cut-out (CO: 314B) to regulate the activation distance.

The antenna structures of the module antenna, coupler coil and the metal ledge of the cut-out (CO) in the rear continuous metal layer may be concentric to one another. The metal card body (MCB) may have two metal layers (continuous and continuous) of different materials sandwiching the electronic component elements, adhesively joined to each other using a thermosetting adhesive (epoxy or polyurethane) that converts from B-stage to C-stage during lamination.

Coating polyurethane resin may be used to replace (in lieu of) adhesive film layers and plastic slugs, and to fill module openings, cut-outs and voids in a metal transaction card. The amplifying element (BAC) and magnetic shielding layer may be encapsulated in a polyurethane resin. The resin may further fill and seal the module opening in the front face continuous metal layer and any voids or recesses in subsequent layers. The resin may fill and seal any discontinuity or opening in the rear discontinuous metal layer. The dual interface chip module may be implanted in a milled-out cavity in the polyurethane resin. Removed metal sections may also be encased in polyurethane resin.

According to some embodiments (examples) of the invention, a smartcard, capable of at least contactless operation, may comprise: a front face continuous metal layer (ML) without a slit and having a module opening (MO); a rear continuous metal layer (ML, 350) having a metal ledge (316A) surrounding a cut-out (314A); a transponder chip module (TCM) with a module antenna (MA); and an assembly of a magnetic shielding layer (MSL) and a booster antenna circuit (BAC) disposed between the front face continuous metal layer and the rear continuous metal layer.

The magnetic shielding layer may be disposed behind the front face continuous metal layer. The booster antenna circuit may be disposed behind the magnetic shielding layer.

The booster antenna circuit may comprise a perimeter coil (PC), a secondary coil and a coupler coil (CC). The booster antenna circuit may comprise a closed loop circuit with no open-ended antenna elements. An integrated parallel plate capacitor bank comprising upper electrodes (UE) and lower electrodes (LE) may be attached in parallel to the perimeter coil and the coupler coil for frequency trimming.

The module antenna (MA) of the transponder chip module (TCM) may be arranged concentrically to overlap the coupler coil (CC) of the booster antenna circuit (BAC) and the metal ledge in the cut-out (CO) in the rear continuous metal layer.

The underside of the front face continuous metal layer may have a protruding boss which extends through the card assembly to the rear continuous metal layer. The protruding boss may add weight to the smartcard, may enhance a metal sound of the card (when tapped on a hard surface such as a table top, for example), and may provide for mechanical robustness.

The rear continuous metal layer (ML, RML) with a cut-out (CO), may be accommodated by at least one additional cut-out arranged on another (such as the opposite) side of the continuous metal layer (to enhance the activation distance).

According to some embodiments (examples) of the invention, a smartcard may comprise a stack-up of: a front face continuous metal layer and a rear continuous metal layer sandwiching electronic component elements (magnetic shielding layer and a booster antenna circuit); wherein the front face continuous metal layer has a top side which has primer and flexible or rigid ink applied to its metal surface by means of digital printing to produce graphics; wherein the graphics are protected by a hard coat layer (rigid ink) which is digitally printed over the flexible or rigid ink; wherein the graphics are further protected by gloss or matte coating (screen-printed or roller coated) layer disposed over the hard coat layer and protecting the surface from scratches.

The exposed protective coating may be laser marked or ablated to receive personalization data.

According to some embodiments (examples) of the invention, a smartcard, may comprise: a front metal layer (ML) without a slit and having a module opening (MO); a rear metal layer (ML) having a cut-out (CO); and a booster antenna circuit (BAC) disposed between the front face metal layer and the rear metal layer. The booster antenna circuit (BAC) may comprise a perimeter coil, a secondary coil, and a coupler coil. Outer windings of the perimeter coil may be arranged to be as close as possible to an outer peripheral edge of the rear metal layer, such as within 500 μm of the outer edge. At least some windings of the perimeter coil may overlap the cut-out. A metal ledge may surround the cut-out (CO) in the rear metal layer. The coupler coil may overlap the metal ledge.

A magnetic shielding layer may be disposed between the front metal layer and the rear metal layer.

A transponder chip module (TCM) may be disposed in the module opening. The transponder chip module may have a module antenna (MA), and may also have contact pads (CP) for dual interface (DI) capability. The transponder chip module (TCM) may be disposed in the module opening of the various layers of the card.

The card may further comprise frequency trimming capacitor electrodes (444D and 444E).

According to some embodiments (examples) of the invention, the card body of a smartcard may comprise a stack-up of layers, including: a front face continuous metal layer having a first module opening (MO) and a first metal ledge to mechanically support a transponder chip module (TCM) having a module antenna (MA); a magnetic shielding layer (MSL) disposed behind the front face continuous metal layer (FML, CML); a booster antenna circuit (BAC) disposed behind the magnetic shielding layer; and a rear continuous metal layer (RML, CML) having a cut-out (CO), a second metal ledge with a metal edge surrounding the cut-out (CO).

The front face continuous metal layer is "continuous", since it does not have a slit (S) extending from a peripheral edge of the front face metal layer to the module opening. In addition, the front face continuous metal layer and the rear continuous metal layer sandwich the assembly of the magnetic shielding layer and booster antenna circuit. The booster antenna circuit may be arranged on a carrier layer such as a PET substrate with the perimeter coil on one side and the coupler coil on the other side. The rear continuous metal layer may have a second cut-out or a combination of cut-outs to increase the activation distance in contactless mode.

Some materials which may be suitable for the dielectric carrier layer may include PET (polyethylene terephthalate), PEN (polyethylene naphthalate), PI (polyimide), and PPS (Polyphenylene Sulfide).

An adhesive layer (338) may be disposed between the front face continuous metal layer and the magnetic shielding layer (342). The rear continuous metal layer (350) may be disposed behind the booster antenna circuit (BAC: 344). A transparent coat of rigid ink (325) followed by a protective coating (324) may be disposed on the front face continuous metal layer (330). A print layer (326), ink and primer, may be disposed between the transparent coat of rigid ink (325) and the front face metal layer (330). A transparent, translucent, white or colored synthetic layer (360) may be disposed behind the rear continuous metal layer (350). At least one of primer (362) and ink (364) may be disposed on the synthetic layer. A laser engravable overlay layer (370) may be disposed behind the synthetic layer (360). A dual-interface chip module (310) may be inserted into the module opening (312) of the card body, with its module antenna (MA: 311) being concentric to the coupler coil (CC: 344C) of the booster antenna circuit (BAC: 344) and the metal ledge (316A) with metal edge surrounding the cut-out (CO: 314A) in the rear continuous metal layer (350). Adhesive layers (338, 348 and 358) are thermosetting epoxy layers or thermosetting adhesive layers (epoxy or polyurethane) with or without a dielectric layer (e.g. PET, PEN, PI, PPS). Between the magnetic shielding layer (342) and the booster antenna circuit (BAC: 344) there is an adhesive layer (343). The cut-out (314A) in the rear continuous metal layer (350) may be stuffed with a plastic slug (315A) of suitable color to match the graphics on the synthetic layer (360). The booster antenna circuit (BAC: 344) is a closed loop circuit with no open-ended antenna elements and having as option an integrated parallel plate capacitor bank for frequency trimming.

According to some embodiments (examples) of the invention, the card body of a smartcard 400A may comprise of a booster antenna circuit on a PET carrier layer (444B) having a top perimeter coil (444A), a bottom coupler coil (444C) and a capacitor bank with top and bottom electrodes (444D, 444E). The top perimeter coil (444A) is routed along all four edges of the card body and inductively couples with the metal at the outer edges of the rear continuous metal layer (450) and its windings overlap the cut-out (414A) or cut-outs (414A and 414B) in the rear continuous metal layer (450). The coupler coil (444C) inductively couples with the module antenna (MA: 411) of a transponder chip module (TCM) while at the same time overlaps the metal ledge (416A) following the path of the cut-out (CO: 414) in the rear continuous metal layer (450). The coupler coil (444C), module antenna (411) and the cut-out (414A) are concentric. The RF performance in terms of contactless transmission and reception is directly related to the proximity of the perimeter coil (444A) to the outer metal edges of the rear continuous metal layer (450) preferably less than 500 µm, its overlap with the cut-out (414A) or cut-outs (414A and 414B); the coverage of the module antenna (411) relative to the coupler coil (444C); and the overlap of the coupler coil (444C) with the metal ledge (416A) that follows the path of the cut-out (414A) in the rear continuous metal layer (450). To enhance RF performance, a secondary coil (444F) connected to the perimeter coil (444A) may overlap the metal ledge (416B) in the cut-out (414B) of the rear continuous metal layer (450).

According to the invention, generally, a transaction card (smartcard) may have a front "continuous" (with no slit) metal layer (ML, CML) with a module opening (MO) for a dual-interface transponder chip module (TCM) having a module antenna (MA) on its bond side or a chip module (CM) without a module antenna (MA). A magnetic shielding layer (MSL) comprising ferrite or non-ferrite material may be disposed below the front face continuous metal layer. An amplifying element, booster antenna circuit (BAC) or a perimeter coil circuit (PCC) may be disposed under the magnetic shielding layer. A rear continuous or discontinuous metal layer (ML, CML, DML) with a shaped cut-out segment having a metal ledge or with a slit (S) extending to the module opening (MO) to function as a coupling frame (CF).

Metal smartcards (SC), or transaction cards are considered to be prestigious due, for example, to their weight and feel, and the metallic sound that they make when tapped (for example) on a table. However, most metal smartcards are not entirely metal, but rather may comprise "hybrid" laminations of one or more layers of metal, with several layers of plastic material, synthetic material, adhesives and the like. The non-metallic layers tend to dampen (reduce) the metallic sound, sometimes referred to as "drop acoustics". It is an object of the invention to improve the drop acoustics of such "hybrid" metal cards.

According to an embodiment of the invention, coating polyurethane resin to any metal layer in the card construction may be used to replace adhesive film layers, plastic slugs and to fill module openings, cut-outs and voids in a metal transaction card. The use of polyurethane resin may enhance or preserve (safeguard) the drop acoustics (metallic sound) of the metal card.

According to an embodiment of the invention, a smartcard or a transaction card (SC: 600) with a front face continuous metal layer (ML, CML: 630) having a module opening (MO: 612) may be sealed with cured polyurethane resin and recessed by CNC milling to accept the insertion of an inductive coupling chip module (TCM/ICM: 610).

The rear side of the front continuous metal layer (CML) may be surface treated and disposed with a single coat of primer or a two-coat adhesive system (primer and an adhesive topcoat) to promote the adhesion of the polyurethane resin to the metal. The surface treatment of the metal may be chemically etched, or sand blasted to produce a scuffed-up surface. The primer may be a chemical bonding agent acting as an interface, or a two-coat adhesive formulation. The primer deposition method may be spraying, dipping or rod coating. After the deposition of the primer/adhesive system, the polyurethane resin may be applied, seeping into any opening, void or cavity, and encapsulating the entire area to a defined thickness.

A magnetic shielding layer (MSL: 642) with a void to allow for inductive coupling between the chip module (TCM/ICM: 610) and the coupler coil (CC: 644C) of the booster antenna circuit (BAC: 644) may be assembled to the polyurethane resin. The booster antenna circuit (BAC: 644) with or without a capacitor bank on a PET carrier layer may be assembled to the magnetic shielding layer (MSL: 642) using an adhesive spacing layer (ASL: 643). The circuitry may be encapsulated and sealed with a layer of polyurethane resin. A graphic print layer (660) may be laminated to the cured polyurethane resin with the artwork protected by an overlay film (OL: 670).

According to an embodiment of the invention, a smartcard (SC: 700) with a front face continuous metal layer (ML, CML: 730) having an opening (MO: 712) sealed with cured polyurethane resin and recessed by CNC milling to accept the insertion of a chip module (CM: 710). The rear side of the continuous metal layer (ML, CML: 730) may be surface treated and disposed with a single coat of primer or a two-coat adhesive system (primer and an adhesive topcoat) to promote the adhesion of the polyurethane resin to the metal. The surface treatment of the metal may be chemically etched, or sand blasted to produce a scuffed-up surface. The primer may be a chemical bonding agent acting as an interface, or a two-coat adhesive formulation. The primer deposition method may be spraying, dipping or rod coating. After the deposition of the primer, the polyurethane resin may be applied (by means of roll coating), seeping into any opening, void or cavity, and encapsulating the entire area to a defined thickness.

A magnetic shielding layer (MSL: 742) with a void to allow for the interconnection between the chip module (CM: 710) and the perimeter coil (744A, wire ends represented by 744C) of the booster antenna circuit (BAC: 744) may be assembled to the polyurethane resin. The booster antenna circuit (BAC: 744) with or without a capacitor bank on a PET carrier layer with electrical traces for galvanic connections may be assembled to the magnetic shielding layer (MSL: 742) using an adhesive spacing layer (ASL: 743). The circuitry may be encapsulated and sealed with a layer of polyurethane resin. A rear discontinuous metal layer (ML, DML: 750) with a module opening (MO: 714) and a slit (S: 720) may be disposed on one side or both sides with an adhesion promoter in the form of a chemical bonding agent or a two-coat adhesive system. Polyurethane resin may be applied to the primed metal surface, filling any opening, discontinuity, void or cavity in the metal layer (ML, DML: 750). A graphic print layer (760) may be laminated to the cured polyurethane resin with the artwork protected by an overlay film (OL: 770).

According to an embodiment of the invention, a metal inlay or metal layer such as a stainless steel sheet with an array of card body sites and openings at each site to accept the later insertion of a chip module, may be chemically or mechanically treated on one side to roughen its surface before applying an adhesion promoter in the form of a primer or a two-coat adhesive system, and on the other side of the metal inlay a sacrificial layer is temporarily applied to protect the surface from scratches during processing and to cover any openings or discontinuities resulting in pockets and channels on the side of the primed roughened surface, with polyurethane resin roll coated to the primed roughened surface having a defined thickness and filling any pockets or channels in the metal inlay, and the polyurethane resin left to cure over time to a hardened state, and post final curing back-lapping the polyurethane resin to the desired thickness before removing the sacrificial layer.

According to an embodiment of the invention, the roll coating process may form a layer of polyurethane resin on the primed surface of the metal inlay with an array of card body sites having a resin thickness which can be mechanically reduced after final curing; the roll coating process also fills any pockets, channels or recesses in the metal with polyurethane resin; the roll coating process in addition fills any voids, openings or holes in the magnetic shielding layer, adhesive spacing layer, PET carrier layer for the booster antenna circuit and any subsequent synthetic or adhesive layers in the stack-up construction; the roll coating process further fills any openings or discontinuities in any intermediate metal layer covered by a sacrificial layer on one side. Optionally, polyurethane resin can be dispensed into any pocket, channel or recess in any of the layers forming a metal card body.

According to an embodiment of the invention, a smartcard or transaction card comprising a front face continuous or discontinuous metal layer may have a layer of polyurethane (PU) resin upon which graphic elements may be digitally (inkjet) printed (primer and ink) thereon. The polyurethane resin may be further doped to facilitate laser engraving or marking of its polymer surface for the purpose of personalization. Prior to the application of the polyurethane resin, the metal layer may be surface treated and primed. The polyurethane resin may be a two-component, low viscosity, semi-flexible PU compound with the physical properties (mix ratio (w/w):polyol/isocyanate, viscosity (mPa*s, or millipascal seconds), density (g/cm 3), pot life (min), gel-time (min), curing time (hr) and final cure (days)) determining the adhesion, hardness and tensile strength of the compound.

In an embodiment of the invention, the fully cured polyurethane resin may be laser or mechanically engraved with delicate graphics such as payment scheme logos, without cracking of the polyurethane resin.

A rear plastic layer formed of non-RF impeding material may support a magnetic stripe and security elements (signature panel and hologram). A portion of the front face continuous metal layer may protrude downward into the magnetic shielding layer and booster antenna circuit layer.

The rear continuous metal layer may have an additional cut-out to regulate the activation distance. The perimeter coil circuit (PCC) may have antenna tracks which widen or separate at the position of the slit (S) and opening (MO).

According to an embodiment of the invention, a smartcard, capable of at least contactless operation may comprise: a front face continuous metal layer (ML, CML) without a slit and having a module opening (MO); a rear continuous metal layer (ML, CML) without a slit and having a shaped cut-out segment with the cut-out having a metal ledge; a transponder chip module (TCM) with a module antenna (MA); and an assembly of at least one of a magnetic shielding layer (MSL) and a booster antenna circuit (BAC) disposed between the front face continuous metal layer and the rear continuous metal layer with a shaped cut-out segment. The magnetic shielding layer may be disposed behind the front face continuous metal layer. The booster antenna circuit may be disposed behind the magnetic shielding layer.

The booster antenna circuit may comprise a perimeter coil (PC), a secondary coil (SC) and a coupler coil (CC) collecting surface currents from the metal card body. The booster antenna circuit may comprise a closed loop circuit with no open-ended antenna elements.

The smartcard may further comprise: an integrated parallel plate capacitor bank comprising upper electrodes (UE) and lower electrodes (LE) attached in parallel to the perimeter coil, secondary and coupler coil for frequency trimming.

The module antenna (MA) of the transponder chip module (TCM) may be arranged concentrically to overlap the coupler coil (CC) of the booster antenna circuit (BAC), with coupler coil, perimeter coil and secondary coil collecting surface currents from the entire metal card body and overlapping a metal ledge of the shaped cut-out segment in the rear continuous metal layer.

The underside of the front face continuous metal layer may have a protruding boss which extends through the card assembly to the rear continuous metal layer. The protruding boss may add weight to the smartcard, may enhance a metal sound of the card, and may provide for mechanical robustness of the card.

The rear continuous metal layer (CML) with a shaped cut-out segment may be provided with at least one additional cut-out segment arranged on another (such as the opposite) side of the continuous metal layer (to enhance the activation distance).

According to an embodiment of the invention, a smartcard (SC) may comprise: a front face continuous metal layer and a rear continuous metal layer sandwiching electronic component elements adhesively attached to each other using thermosetting adhesive (epoxy or polyurethane). The thermosetting adhesive (epoxy or polyurethane) may be applied in B-stage, and converted to C-stage after a lamination process involving selected temperature and pressure.

According to an embodiment of the invention, a smartcard may comprise a stack-up of a front face continuous metal layer and a rear continuous metal layer sandwiching electronic component elements (magnetic shielding layer and a booster antenna circuit); wherein the front face continuous metal layer has a top side which has primer and flexible or rigid ink applied to its metal surface by means of digital printing to produce graphics; and wherein the graphics are protected by a hard coat layer (rigid ink) which is digitally printed over the flexible or rigid ink; and wherein the graphics are further protected by gloss or matte coating (screen-printed or roller coated) layer disposed over the hard coat layer and protecting the surface from scratches. The exposed protective coating may be laser marked or ablated to receive personalization data.

According to an embodiment of the invention, a smartcard (SC) may comprise: a front metal layer (ML, FML) without a slit and having a module opening (MO); a rear metal layer (ML, RML) having a shaped cut-out segment; and a booster antenna circuit (BAC) disposed between the front face metal layer and the rear metal layer; wherein the booster antenna circuit (BAC) comprises a perimeter coil, a secondary coil and a coupler coil; and wherein outer windings of the perimeter coil are arranged to be as close as possible to an outer peripheral edge of the rear metal layer. A magnetic shielding layer may be disposed between the front metal layer and the rear metal layer. The smartcard may further comprise: frequency trimming capacitor electrodes.

A transponder chip module (TCM) having a module antenna (MA) may be disposed in the module opening and extending to the cut-out segment. The transponder chip module may have the module antenna (MA) and contact pads (CP) for dual interface capability.

The outer windings of the perimeter coil may be within approximately 500 μm of the outer edge of the rear metal layer. At least some windings of the perimeter coil may overlap the cut-out segment. A metal ledge may follow the shape of the cut-out segment; wherein the coupler coil overlaps the metal ledge.

According to an embodiment of the invention, a smartcard, capable of at least contactless operation may comprise: a front face continuous metal layer (ML, CML) without a slit and having a module opening (MO); a rear discontinuous metal layer (ML, DML) with a straight or shaped slit extending to a module opening (MO); a chip module (CM) without a module antenna (MA); and an assembly of at least one of a magnetic shielding layer (MSL) and a perimeter coil circuit (PCC) disposed between the front face continuous metal layer (CML) and the rear discontinuous metal layer (DML), whereby the coil ends of the perimeter coil circuit (PCC) are galvanically (physically) connected to termination points on the bond side of the chip module (CM) while the antenna tracks of the perimeter coil circuit (PCC) widen or separate at the position of the slit (S) and module opening (MO).

In some embodiments, such as may be shown in FIGS. 5A,B,C, rather than there being an inductive coupling with the chip module, there is a physical (galvanic) connection with the perimeter coil circuit 544.

According to an embodiment of the invention, a method of manufacturing a smartcard (SC), having a front face metal layer (FML) with a module opening (MO) to accept the implanting of a chip module (TCM, ICM) and additional layers of adhesive, plastic or synthetic material may comprise: applying an adhesion promoter comprising a primer layer (PL) to a rear (back) surface of the front face metal layer; and allowing the primer layer to dry; wherein the adhesion promoter further comprises an adhesive top-coat (TC); and further comprising: applying the adhesive top-coat onto the dried primer layer; and coating the top-coat with polyurethane resin (PU). The polyurethane resin may be applied by a process of roll coating or slot nozzle coating.

At least some of the layers may have openings, voids, or cavities; and the polyurethane resin seeps into the openings, voids, or cavities. The polyurethane resin may encapsulate an entire area of the smartcard to which it is applied, to a defined thickness.

After the polyurethane resin is fully cured, it may be back-lapped to reduce its thickness. It may be laser etched. It may be mechanically engraved. It may be printed upon. The polyurethane resin may be filled with glass fiber for increased strength. The polyurethane resin may be colored with a pigment.

Prior to applying the primer layer, a surface treatment may be performed on the rear surface of the front metal layer to produce a scuffed-up surface. The surface treatment may comprise chemically etching or sand blasting.

The adhesion promoter may comprise a chemical bonding agent (primer) acting as an interface, or a two-coat adhesive formulation. The adhesion promoter may be deposited by spraying, dipping or rod coating.

The polyurethane resin, when cured, may contribute to a metallic sound that the smartcard makes (exhibits) with it is tossed on a hard surface, for example, such as a table.

According to an embodiment of the invention, a smartcard (SC) may comprise: a front face metal layer (FML) having a module opening (MO) for accepting a transponder chip module (TCM); wherein: a rear surface of the front face metal layer may be surface treated and coated with a single or two-coat adhesive formulation to promote adhesion of a layer of polyurethane resin (PU) to the rear surface of the front face metal layer. The two-coat adhesive formulation comprises a primer layer and an adhesive top-coat. The front face metal layer may be a continuous metal layer (CML) that does not have a slit extending from a peripheral edge of the front face metal layer to the module opening. The front face metal layer may be a discontinuous metal layer (DML) that does has a slit extending from a peripheral edge of the front face metal layer to the module opening.

According to an embodiment of the invention, a smartcard (SC) may comprise: a front face metal layer (FML) having a module opening (MO) for receiving a transponder chip module (TCM, ICM) having a module antenna (MA); a magnetic shielding layer (MSL) disposed behind the front face metal layer and having a void; a booster antenna circuit (BAC) on a polyethylene terephthalate (PET) carrier layer disposed behind the magnetic shielding layer and having a void; and a rear metal layer (RML) having a first cut-out (CO) segment. The smartcard may further comprise: a second cut-out (CO) segment in the rear metal layer disposed, for example, on an opposite side of the rear metal layer so that the rear metal layer has a cut-out on the left side and a cut-out on the opposite right side. Polyurethane resin (PU) may fill the module opening and any underlying voids, holes or recesses in the various layers of the smartcard.

The front face metal layer (FML) of the smartcard may be highly polished stainless steel, brushed stainless steel, diamond-like carbon (DLC) or physical vapor deposition (PVD) coated stainless steel.

The polyurethane resin (PU) may cover a front surface of the front face metal layer, may be transparent, may act as a protective layer to protect against scratches, and may accept personalization data through laser or mechanical engraving.

Other and additional embodiments and variations thereof may be disclosed, whether or not they are claimed herein. Features of an embodiment may be incorporated into another embodiment, whether or not such combination of features is explicitly shown.

In their various embodiments, the invention(s) described herein may relate to industrial and commercial industries, such RFID applications, payment transaction cards (metal, ceramic, plastic or a combination thereof), electronic credentials, identity cards, loyalty cards, access control cards, and the like.

Other objects, features and advantages of the invention(s) disclosed herein may become apparent in light of the following illustrations and descriptions thereof.

BRIEF DESCRIPTION OF THE DRAWINGS

Reference will be made in detail to embodiments of the disclosure, non-limiting examples of which may be illustrated in the accompanying drawing figures (FIGS). The figures may generally be in the form of diagrams. Some elements in the figures may be stylized, simplified or exaggerated, others may be omitted, for illustrative clarity.

Although the invention is generally described in the context of various exemplary embodiments, it should be understood that it is not intended to limit the invention to these particular embodiments, and individual features of various embodiments may be combined with one another. Any text (legends, notes, reference numerals and the like) appearing on the drawings are incorporated by reference herein.

Some elements may be referred to with letters ("AS", "CBR", "CF", "MA", "MT", "TCM", etc.) rather than or in addition to numerals. Some similar (including substantially identical) elements in various embodiments may be similarly numbered, with a given numeral such as "310", followed by different letters such as "A", "B", "C", etc. (resulting in "310A", "310B", "310C"), and may collectively (all of them at once) referred to simply by the numeral ("310").

Figure 1A:
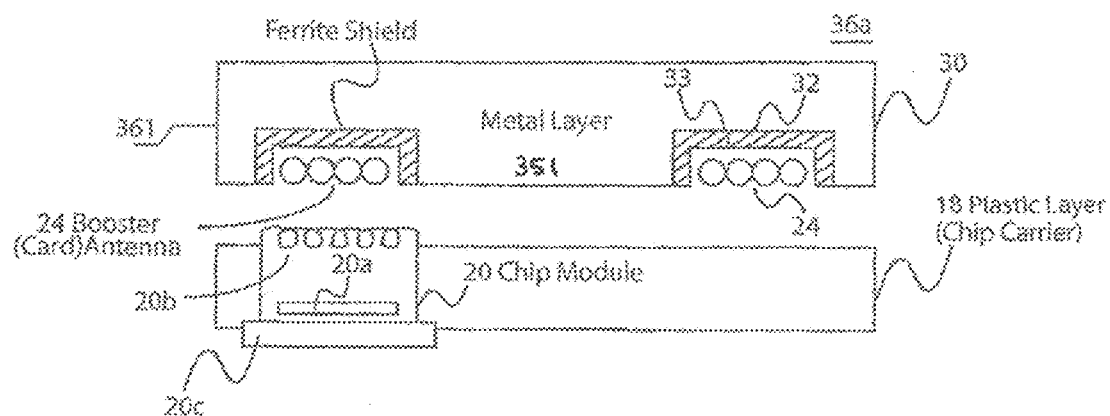
Figure 3A:
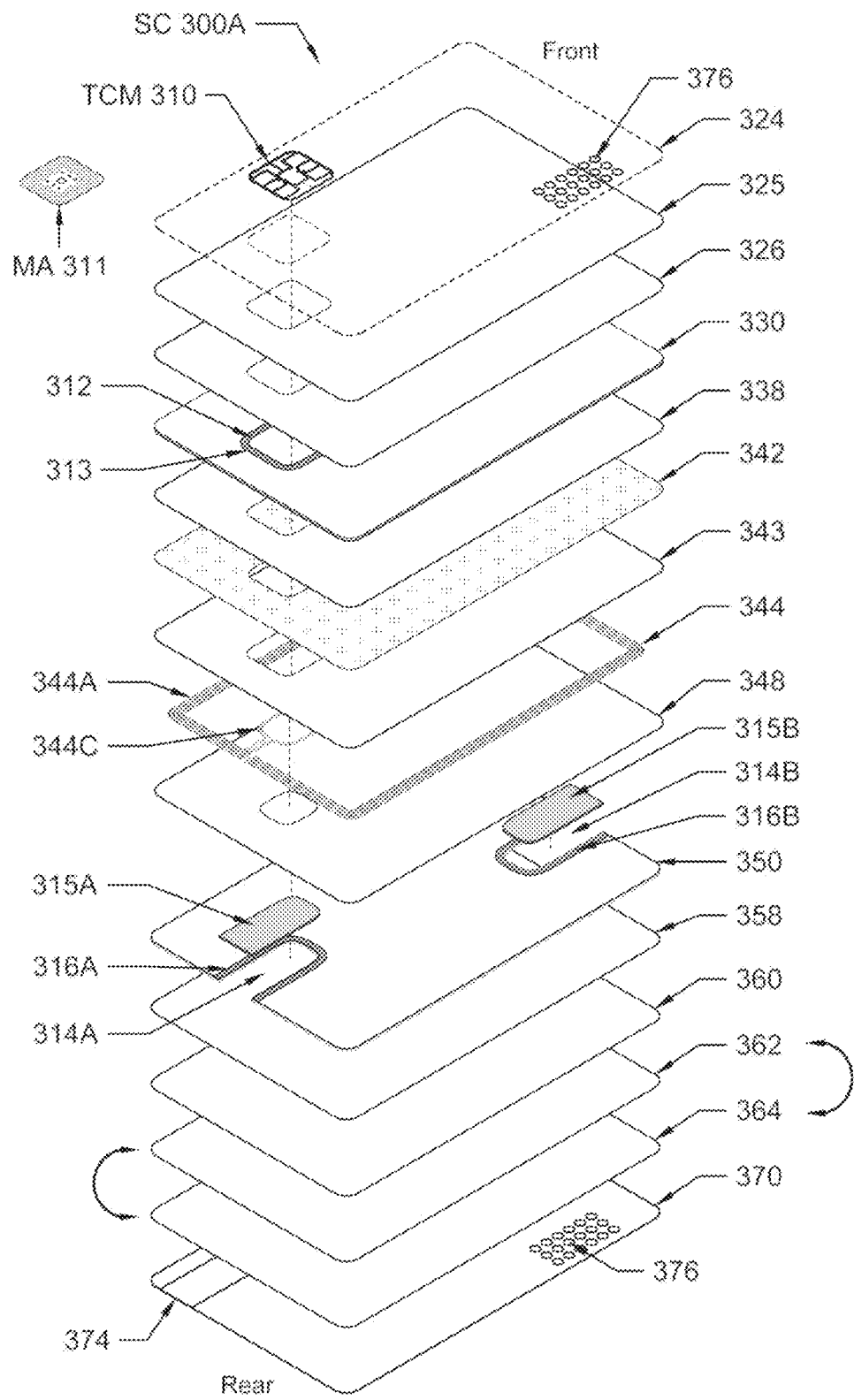

FIG. 1A (compare FIG. 3A of U.S. Pat. No. 10,275,703) is a cross-sectional diagram of a smart metal card with ferrite shield formed between the card and chip antennas and the cards' metal layer, according to the prior art.

Figure 1B:
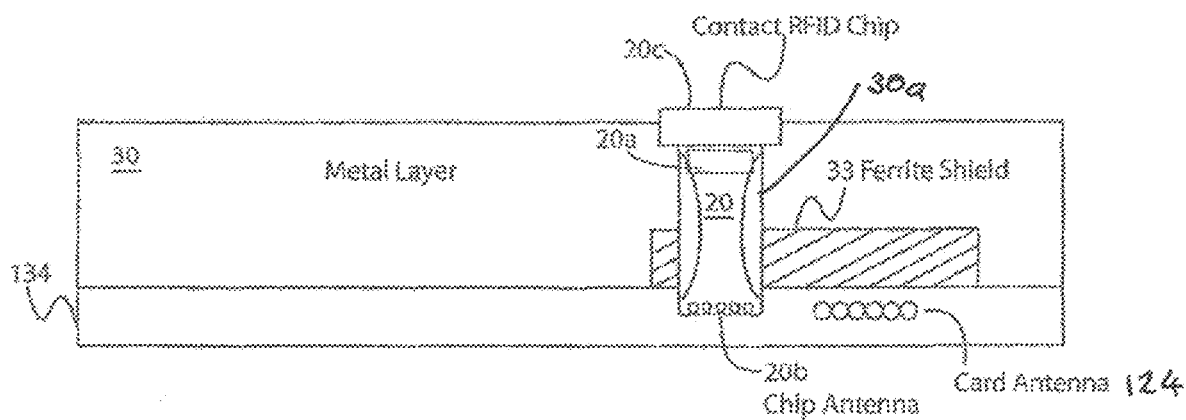

FIG. 1B (compare FIG. 6B of U.S. Pat. No. 10,275,703) is a simplified partial cross-sectional view of a dual interface smart card, according to the prior art.

Figure 1C:
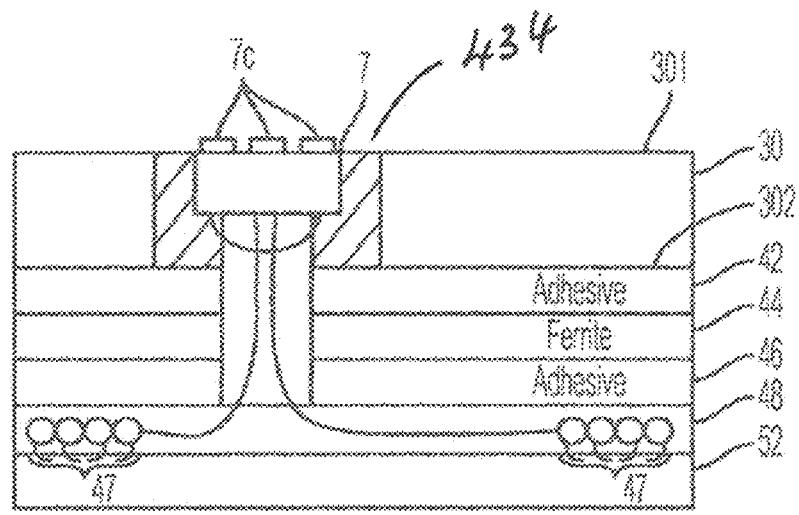

FIG. 1C (compare FIG. 4 of U.S. Pat. No. 10,318,859) is a cross-sectional diagram of the layers of a metal-containing card body with booster antenna and shielding layer, according to the prior art.

Figure 2:
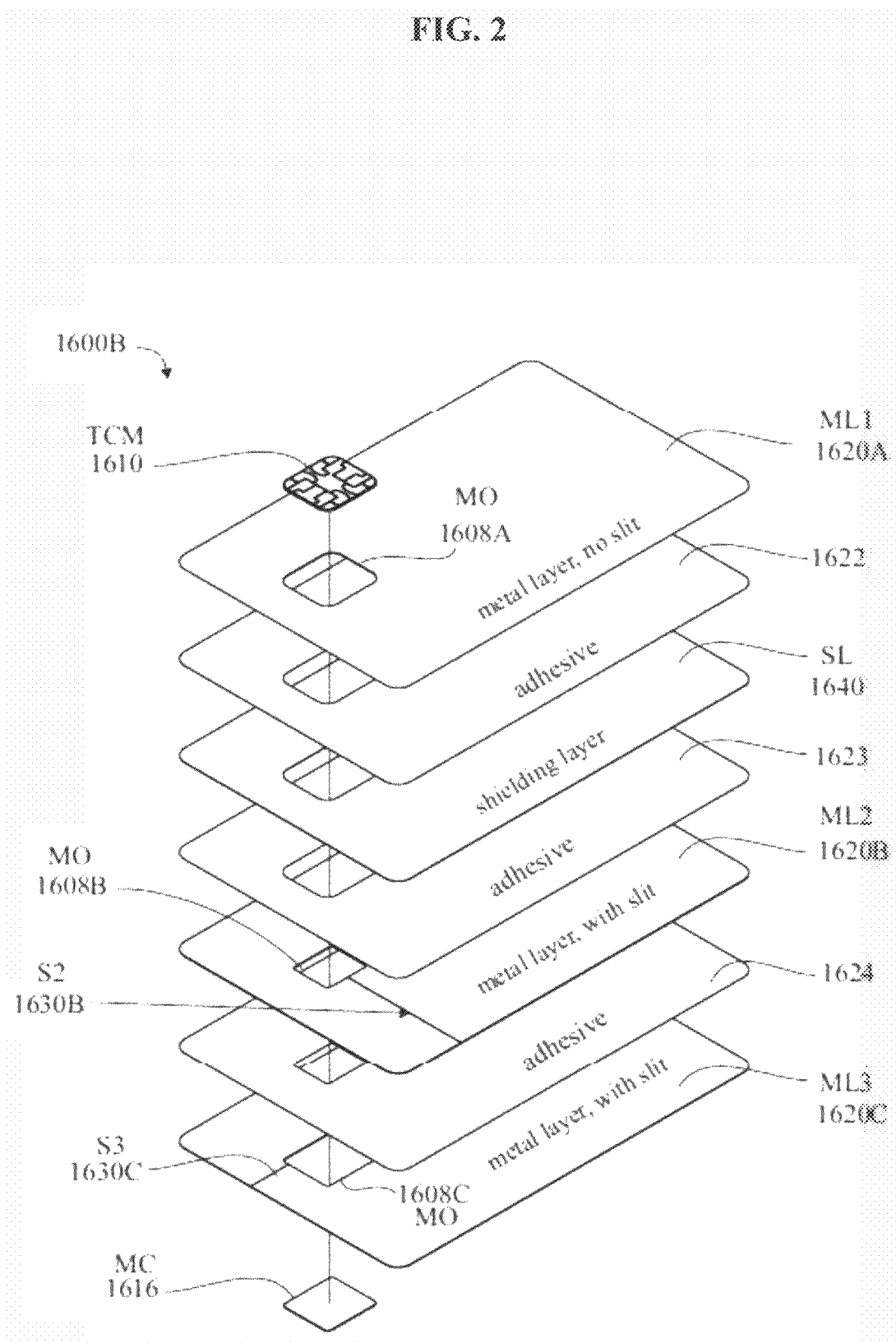

FIG. 2 (compare 16B of U.S. Pat. No. 9,836,684) is a diagram (exploded perspective view) of a shielded metal laminated smartcard (RFID device), according to the prior art.

FIG. 3A is a diagram (exploded perspective view) of the stack-up construction of a dual interface metal face smartcard with contactless "tap-to-pay" function operating from the rear side of the card body with two metal layers, one continuous and the other continuous, sandwiching electronic component elements such as a booster antenna circuit (BAC) mounted to a magnetic shielding layer, with the booster antenna circuit (BAC) adhesively attached to the rear continuous metal layer with at least one cut-out and the magnetic shielding layer adhesively attached to the front continuous metal layer, according to an embodiment of the invention.

Figure 3B:
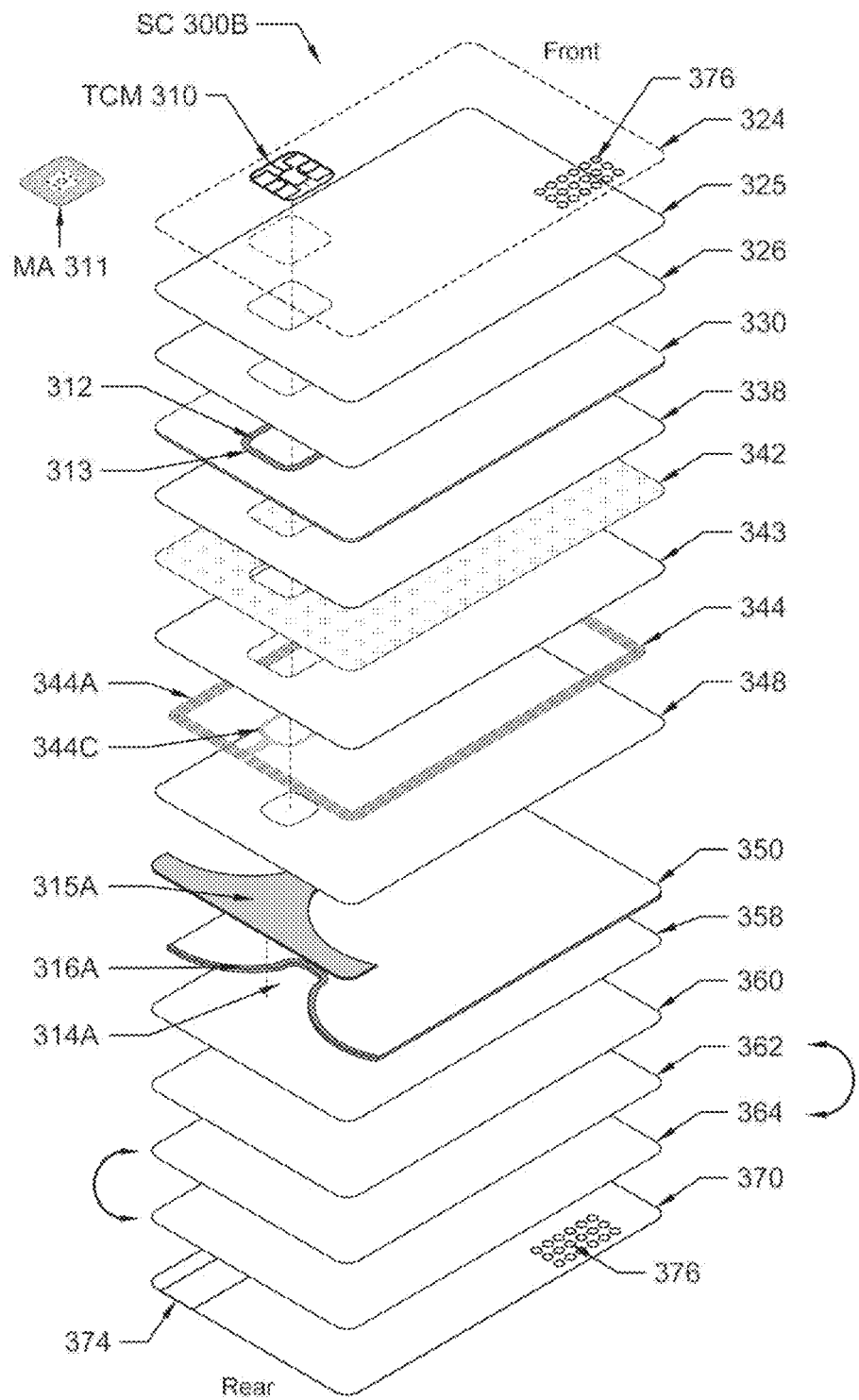

FIG. 3B is a modification of FIG. 3A having a shaped cut-out segment which removes metal along the entire left-hand-side of the rear continuous metal layer forming the metal card body, according to an embodiment of the invention.

Figure 3C:
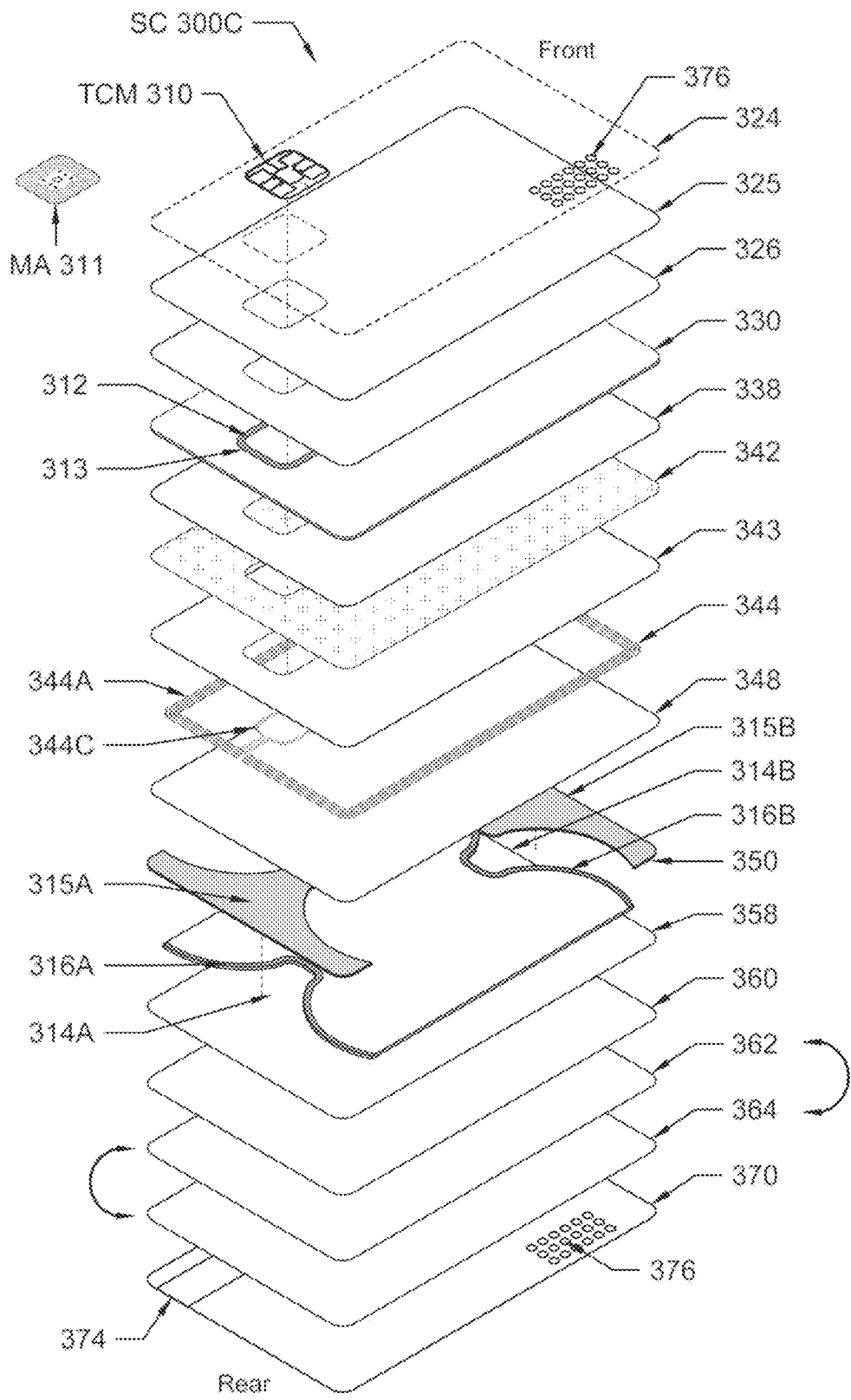

FIG. 3C has two shaped cut-out segments which removes metal along the entire left and right hand sides of the rear continuous metal layer forming the metal card body, according to an embodiment of the invention.

Figure 4A:
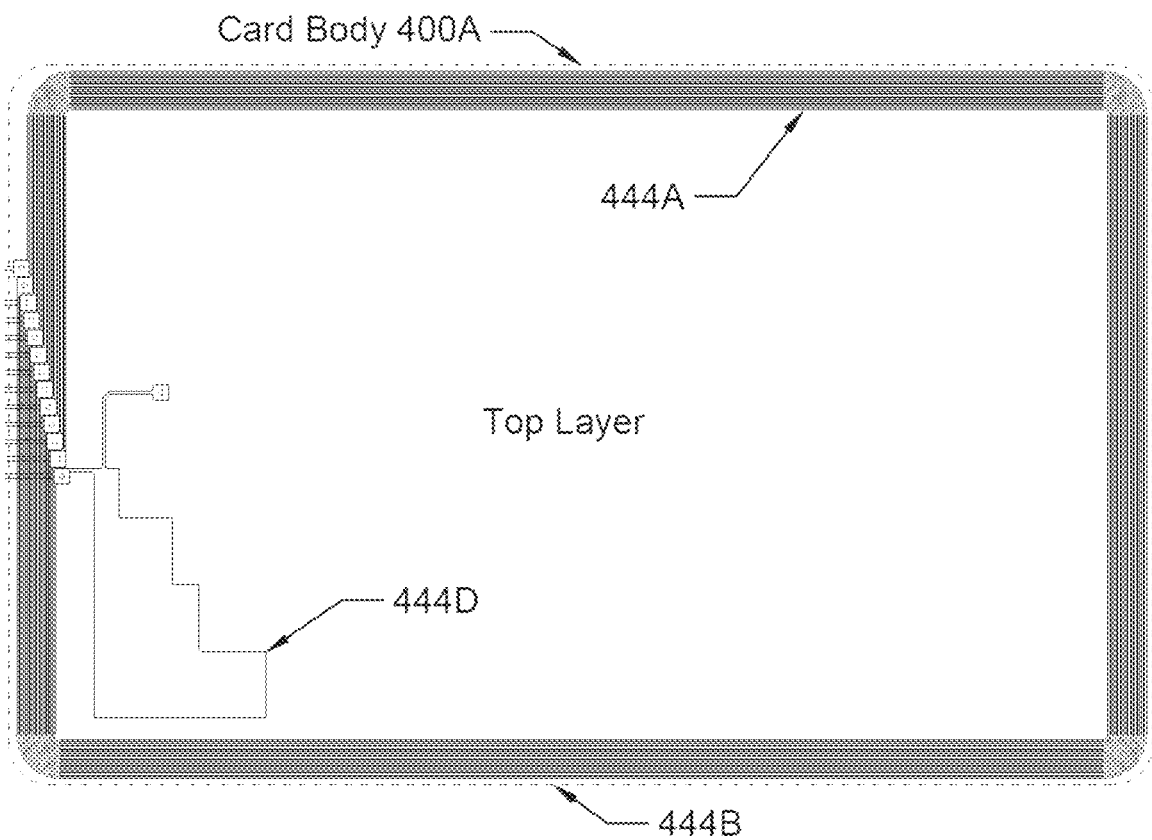

FIG. 4A is a diagram showing a top layer of a plated copper antenna circuit for coupling with the perimeter metal edges of a continuous metal layer, according to an embodiment of the invention.

Figure 4B:
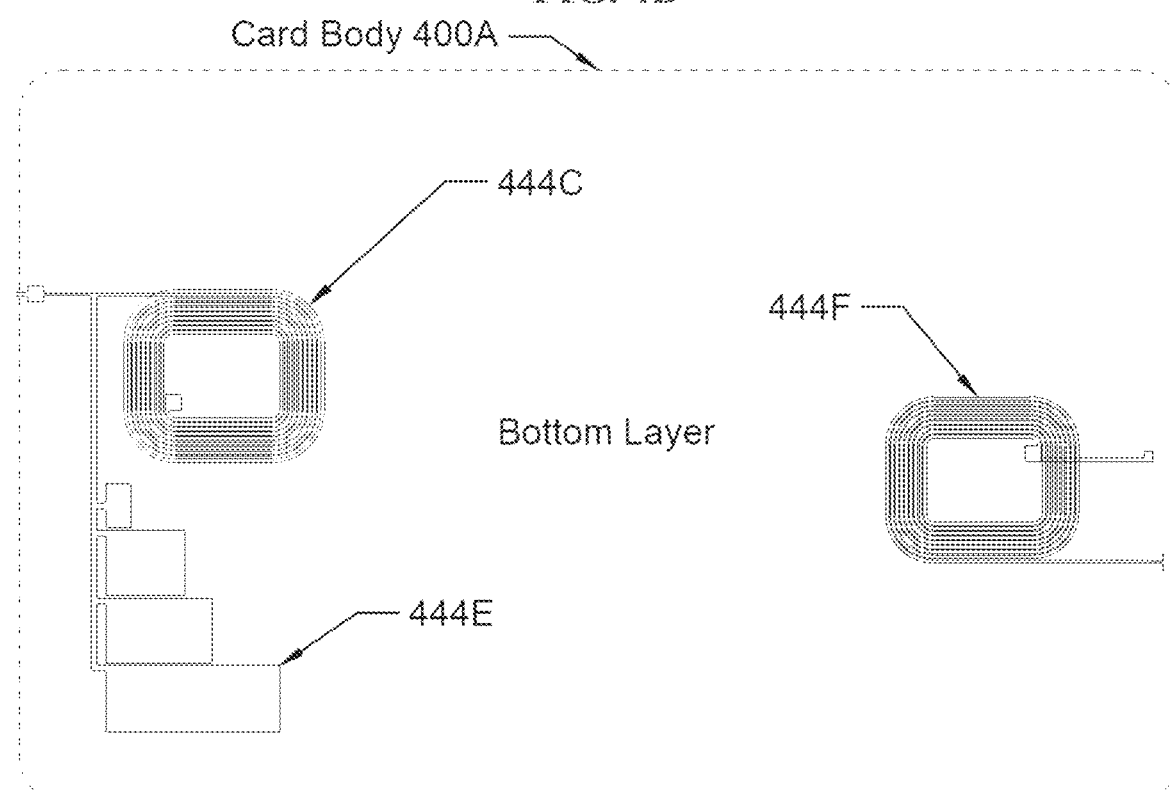

FIG. 4B is a diagram showing a bottom layer of a plated copper antenna circuit for coupling simultaneously with a module antenna of a transponder chip module and a metal ledge in the cut-out of a continuous metal layer, according to an embodiment of the invention.

Figure 4C:
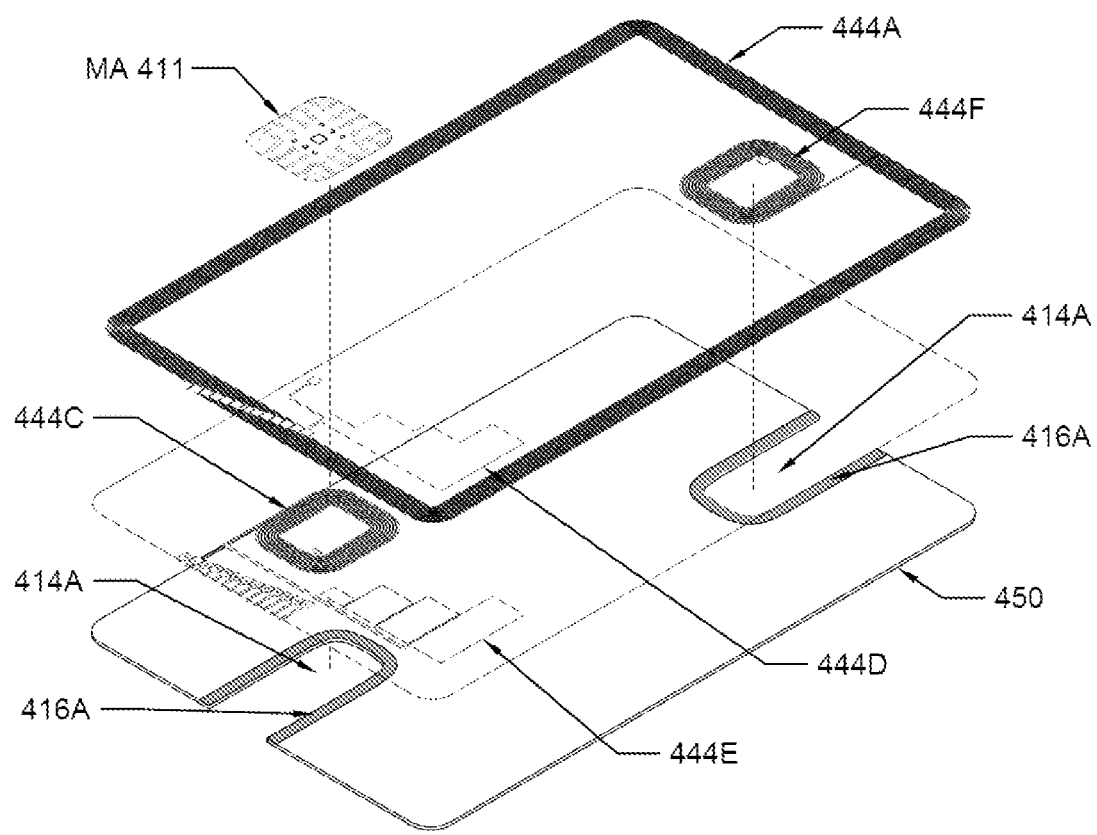

FIG. 4C is an exploded view of booster antenna circuit assembled to a continuous metal layer forming the rear side of a smartcard, according to an embodiment of the invention.

Figure 5A:
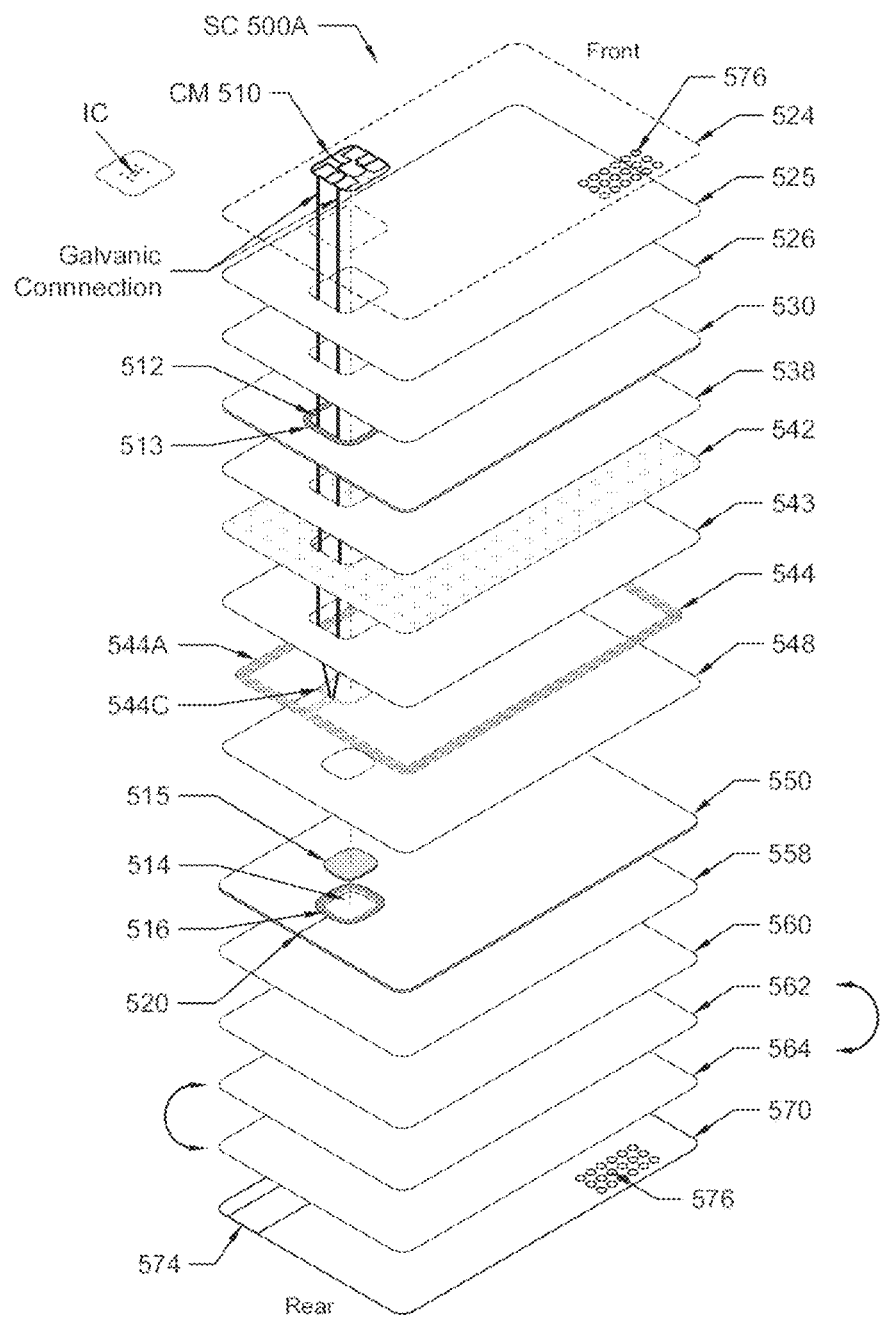

FIG. 5A is a diagram (exploded perspective view) of the stack-up construction of a dual interface metal face smartcard with contactless "tap-to-pay" function on one side of the card body having an in-card perimeter coil circuit (without a coupler coil) galvanically connected to a chip module (without a module antenna), and the perimeter coil circuit routed along the outer edges of the card body with its antenna tacks crossing or overlapping a straight or shaped slit (in a direction parallel or perpendicular to the slit) at a module opening in an underlying metal interlayer functioning as a coupling frame, according to an embodiment of the invention.

Figure 5B:
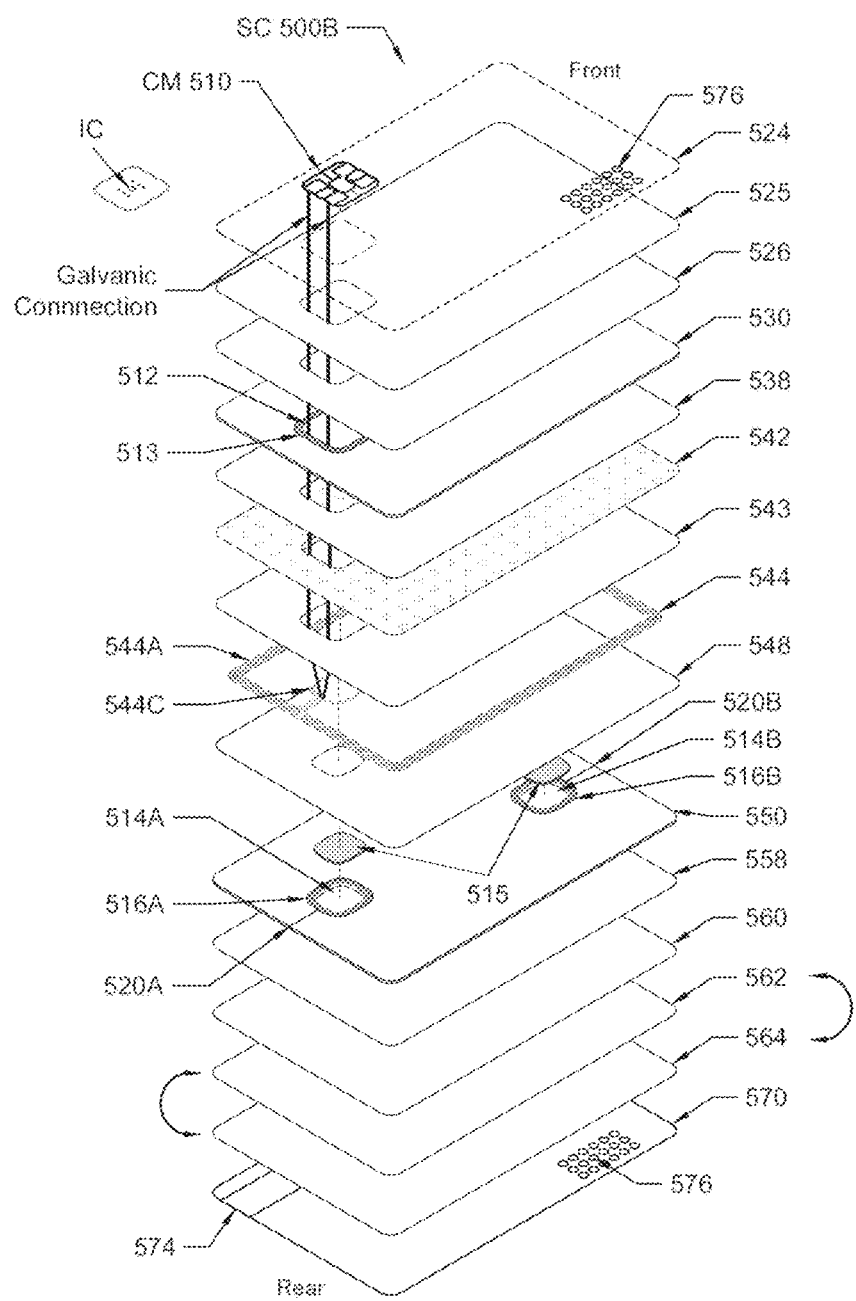

FIG. 5B is a similar diagram to FIG. 5A showing the stack-up construction of a dual interface metal face smartcard with contactless "tap-to-pay" function on one side of the card body having a metal interlayer with two opposing slits (straight or shaped) to function as a coupling frame, with the antenna tracks of the perimeter coil circuit crossing or overlapping both slits (in a direction parallel or perpendicular), according to an embodiment of the invention.

Figure 5C:
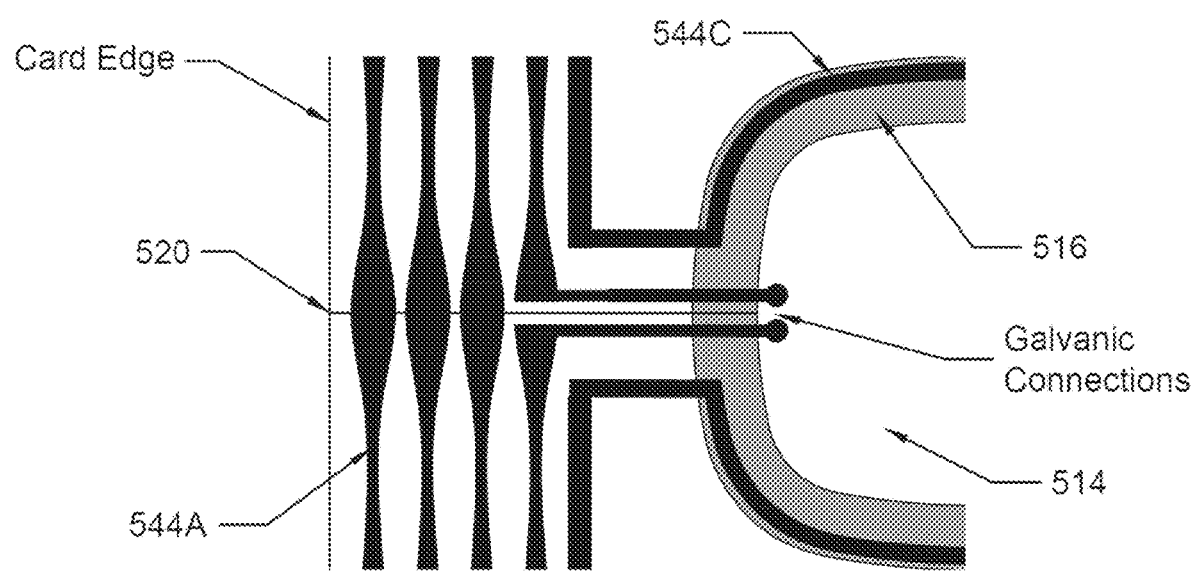

FIG. 5C is a detail view of a perimeter coil circuit with its antenna tracks crossing or overlapping a straight or shaped slit extending to an opening in the rear discontinuous metal layer whereby the antenna tracks separate or widen (thereby increasing the pitch between antenna tracks) at the position of the slit and opening to collect surface currents, according to an embodiment of the invention.

Figure 6:
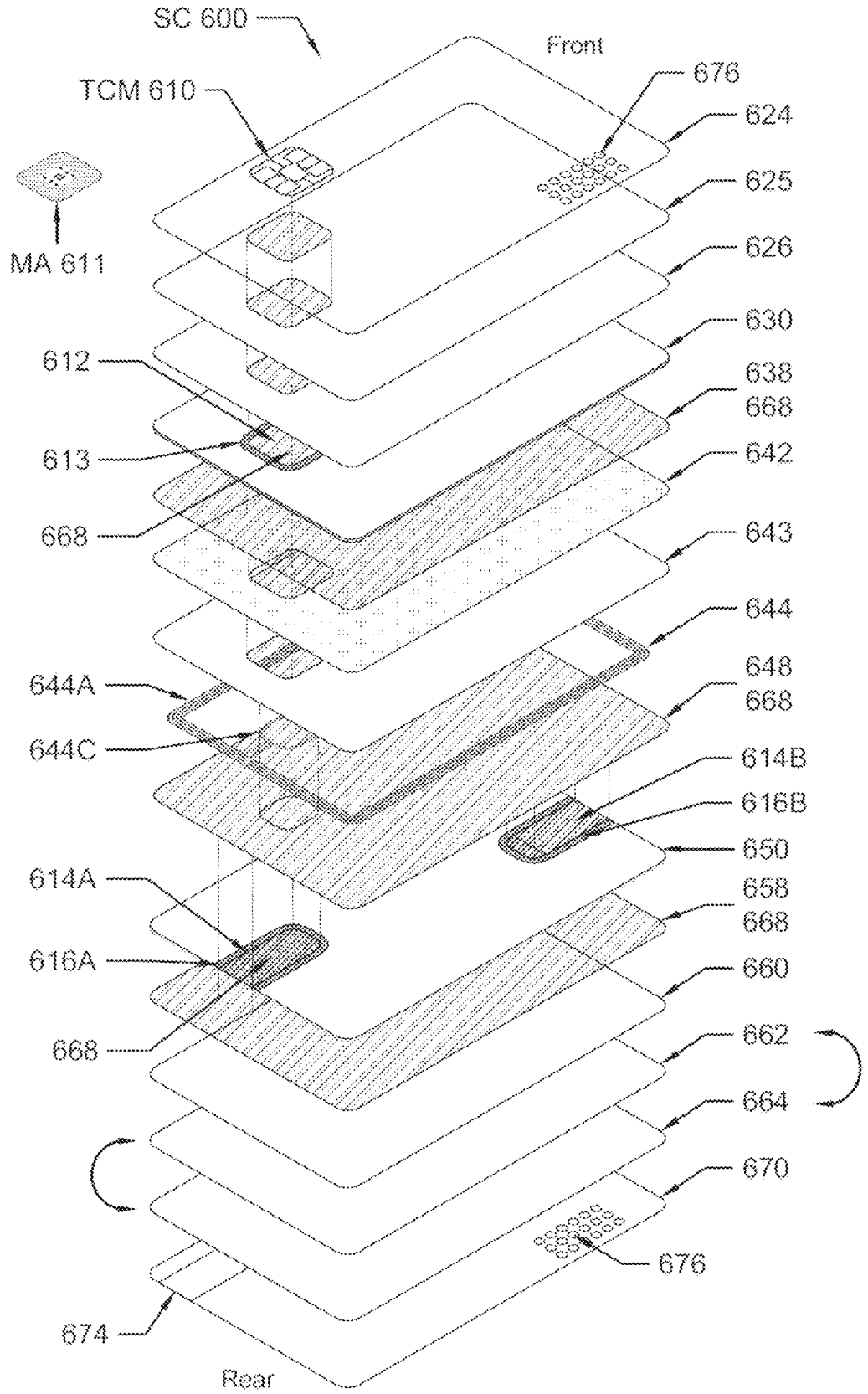

FIG. 6, a modification of FIG. 3A, is a diagram (exploded perspective view) of the stack-up construction of a dual interface metal face smartcard, according to an embodiment of the invention, with contactless "tap-to-pay" function operating from the rear side of the card body with two metal layers, one continuous and the other continuous, sandwiching electronic component elements encapsulated by polyurethane resin such as a booster antenna circuit (BAC) mounted to a magnetic shielding layer, with the booster antenna circuit (BAC) attached to the rear continuous metal layer with at least one cut-out segment in the rear metal layer and the magnetic shielding layer attached to the front continuous metal layer, with the cut-out segment (in rear metal layer), module opening (in front metal layer) and voids in the layers forming the card body filled and sealed with polyurethane resin, according to an embodiment of the invention.

Figure 7:
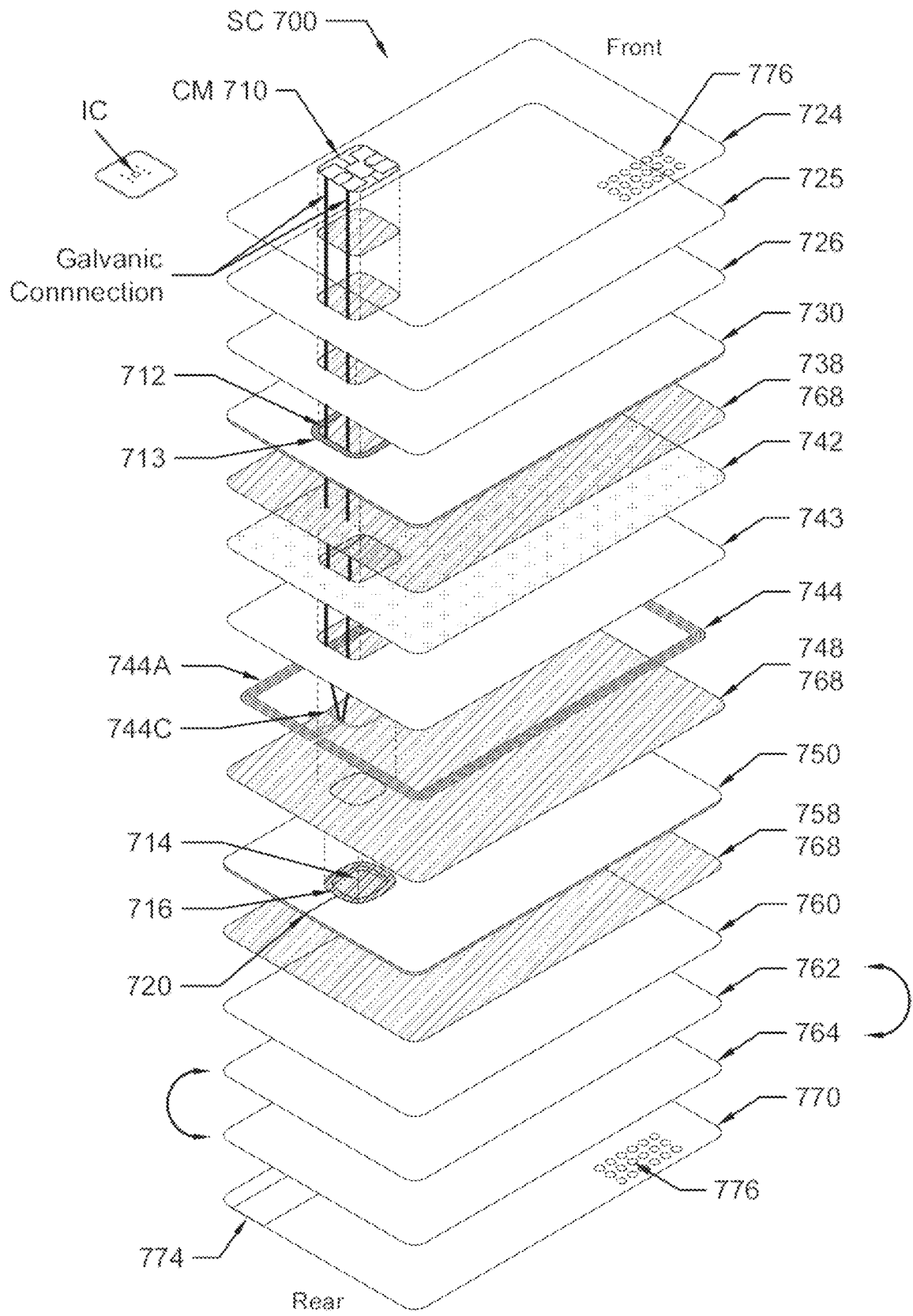

FIG. 7, a modification of FIG. 5A, is a diagram (exploded perspective view) of the stack-up construction of a dual interface metal face smartcard, according to an embodiment of the invention, with contactless "tap-to-pay" function on one side of the card body having an in-card perimeter coil circuit (without a coupler coil) galvanically connected to a chip module (without a module antenna), and the perimeter coil circuit routed along the outer edges of the card body with its antenna tacks crossing or overlapping a straight or shaped slit (in a direction parallel or perpendicular to the slit) at a module opening in an underlying metal interlayer functioning as a coupling frame, wherein the metal layers are encapsulated at least on one side with polyurethane resin, wherein any opening or discontinuity in the metal layers is filled and sealed with polyurethane resin, and wherein the electronic elements and circuitry and any voids in the layers making up the card construction are also encased in polyurethane resin, according to an embodiment of the invention.

Figure 8:
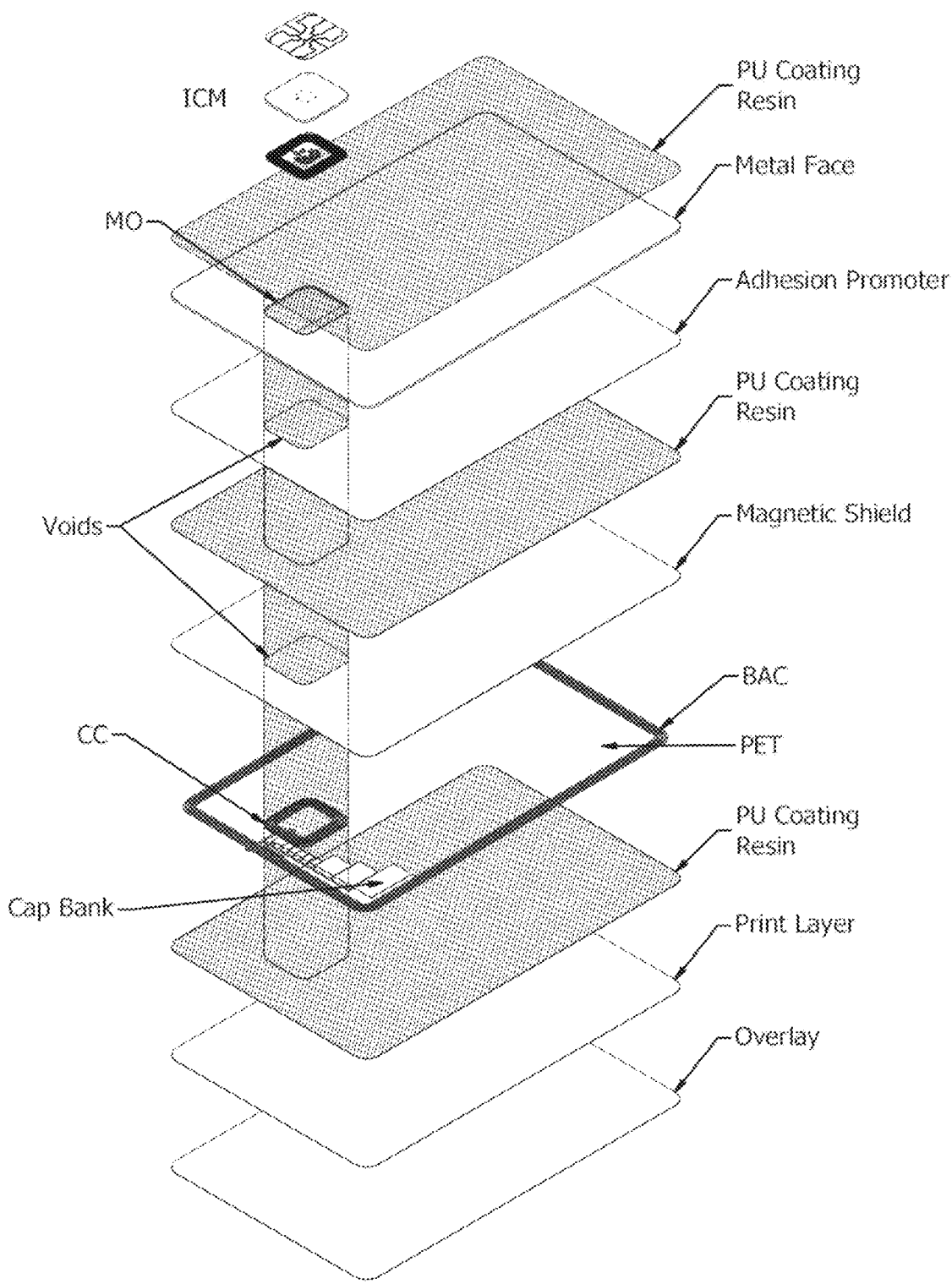

FIG. 8 is an exploded view of a smartcard or a transaction card, according to an embodiment of the invention. with a front face continuous or discontinuous metal layer disposed with a layer of transparent polyurethane resin and having a module opening equally sealed with polyurethane resin and recessed by CNC milling to accept the insertion of an inductive coupling chip module. The front and rear sides of the continuous or discontinuous metal layer may be surface treated and disposed with a primer (single-coat or a two-coat adhesive system) to promote the adhesion of the polyurethane resin to the metal. After the deposition of the primer, the polyurethane resin may be applied, seeping into any opening, void or cavity, and encapsulating the entire area to a defined thickness. A magnetic shielding layer with a void to allow for inductive coupling between the chip module and the coupler coil of the booster antenna circuit may be assembled to the polyurethane resin. The booster antenna circuit with a capacitor bank on a PET carrier layer (with a void) may be assembled to the magnetic shielding layer using an adhesive spacing layer. The circuitry may be encapsulated and sealed with a layer of polyurethane resin. A graphic print layer may be laminated to the cured polyurethane resin with the artwork protected by an overlay film, as an embodiment of the invention.

In some figures presented herein, the PET carrier layer (with void) may be omitted, for illustrative clarity.

DESCRIPTION

Various embodiments (or examples) may be described to illustrate teachings of the invention(s), and should be construed as illustrative rather than limiting. It should be understood that it is not intended to limit the invention(s) to these particular embodiments. It should be understood that some individual features of various embodiments may be combined in different ways than shown, with one another. Reference herein to "one embodiment", "an embodiment", or similar formulations, may mean that a particular feature, structure, operation, or characteristic described in connection with the embodiment is included in at least one embodiment of the present invention. Some embodiments may not be explicitly designated as such ("an embodiment").

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, some well-known steps or components may be described only generally, or even omitted, for the sake of illustrative clarity. Elements referred to in the singular (e.g., "a widget") may be interpreted to include the possibility of plural instances of the element (e.g., "at least one widget"), unless explicitly otherwise stated (e.g., "one and only one widget"). In the following descriptions, some specific details may be set forth in order to provide an understanding of the invention(s) disclosed herein. It should be apparent to those skilled in the art that these invention(s) may be practiced without these specific details. Any dimensions and materials or processes set forth herein should be considered to be approximate and exemplary, unless otherwise indicated. Headings (typically underlined) may be provided as an aid to the reader, and should not be construed as limiting.

Reference may be made to disclosures of prior patents, publications and applications. Some text and drawings from those sources may be presented herein, but may be modified, edited or commented to blend more smoothly with the disclosure of the present application.

Dual Interface Metal Cards with a Ferrite Layer

FIG. 1A includes a sectional view of metal substrate 30 having an exterior (outer) surface 361 and an inner surface 351. After groove 32 is formed on the inner surface 351, ferrite material 33 and an adhesive such as epoxy, cyanoacrylate, silicone based system or thermoplastic adhesive are applied into the channel defined by the groove 32. The ferrite 33 may be applied as a die cut sheet or as a ferrite slurry acrylic oligomer intermediate which will harden under UV exposure or after the slurry solvent is driven off. It should be noted that the ferrite 33 is preferably applied so as to be below the inner surface of the substrate 30 and to rise up to the surface of the card at the edges of groove 32. Note the antenna wires cannot be completely encased or completely shielded by the ferrite layer. That is the ferrite shield cannot completely surround the antenna.

The ferrite shield 33 overlies card (booster) antenna 24. A plastic layer 18 is formed below subassembly 36a. Layer 18 contains and includes a module 20, which contains a microprocessor chip 20a and a chip antenna 20b coupled to chip 20a.

Note that contact pad 20c is on the opposite side of the metal substrate.

In operation, ferrite material 33 deposited in groove 32 shields antenna 24 (and chip antenna 20b) from metal substrate 30, to make it possible for RF radiation to enter and be emitted from antenna 24.

A metal surface interferes with RF radiation in that it absorbs incident RF signals with the metal acting as a virtual ground. The ferrite layer formed between the card antenna 24 (including chip antenna 20b) and the metal layer 30 reflects incident RF signals so they are not absorbed by the metal layer.

Note that a reader (not shown) would be positioned to interrogate the smart card from the non-metallic side of the card for contactless operation.

As set forth in some claims of U.S. Pat. No. 10,275,703:
1. A metal smart card comprising: a plastic layer having a top surface; a metal layer overlying the plastic layer, said metal layer having an inner surface; a groove formed within the inner surface of said metal layer; a card antenna comprising antenna windings disposed within said groove and wound along the top surface of or within said plastic layer; and a strip of RF shielding material lining said groove and disposed between the inner surface of the metal layer and the antenna windings, said strip of RF shielding material overlying the antenna windings and limited to a length and a width sufficient to track the underlying antenna windings to form an RF shield between the antenna windings and the metal layer.
2. The metal smart card of claim 1, wherein the antenna windings are wound adjacent to an outer periphery of the plastic layer.

In FIG. 1A, the subassembly 36a includes a metal substrate 361 and a plastic chip carrier layer 18. The metal layer 361 is shown with a ferrite shield 33 attached to the groove 32 and with a booster card antenna 24 formed (wound) directly within the ferrite shielded groove.

Alternatively, the coils of a booster antenna may be formed on, or within, a plastic layer. Ferrite material is formed or placed substantially only over the coil layout area to provide an RF shield and a metal layer can then be attached over the shielded coils to form a smart metal card with a limited amount of ferrite material.

FIG. 1B is a simplified partial cross-sectional view of a dual interface smart card 30. The contact pad 20c is on the same side/surface as the exterior (outer) surface of the metal layer 30. The card antenna 124 is shielded with a ferrite layer.

The ferrite may be applied as a die cut sheet or as a ferrite slurry which will harden under UV exposure or after the solvent is driven off. Substrate 30 is formed with a through bore 30a, which is shaped to receive an RFID module 20, which contains a microprocessor chip 20a, an antenna 20b and a contact pad 20c. Pad 20c is a conventional contact pad used in contact-type smart cards and is positioned to engage contacts in a card reader when the smart card is inserted therein. Antenna 20b is shown to project below metal substrate 30, for example, by about 0.01 inch.

Formed below substrate 30 is a plastic layer 134 having an antenna 124 formed by winding the coils (windings) 24a within a plastic layer 134. Layer 134 is formed with a recess shaped to receive the portion of antenna 20b that extends below substrate 30. This permits antenna 20b to extend in close proximity to antenna 124.

Preferably, the ferrite shield 33 extends laterally beyond winding 124 by at least 0.005 inches, in order to ensure that substrate 30 will not interfere with transmission or reception by antenna 124.

As shown in FIG. 1C, a metal-containing card body may include the following structure:

A metal layer 30 is intended to serve as the top layer of a card. The metal layer 30 has a top (front) surface 301 and a bottom (back) surface 302 and a thickness (D) which may range from less than 0.01 inches to more than 0.02 inches.

A plug 434 of any material which does not interfere with RF transmission is formed or shaped to conform to the dimensions of the hole/opening to fill the cut out region. Plug 434 is processed and functions to secure the IC module. The interior walls of the hole and/or the exterior walls of the plug 434 is/are coated with a suitable adhesive so the plug 434 adheres firmly to the walls of the hole/opening throughout the processing of the metal layer in the formation of the card. The plug 434 may be made of any thermoplastic material such as PET, PVC or other polymer or any material such as epoxy resins and a ceramic.

An adhesive layer 42 is used to attach a ferrite layer 44 to the back surface 302 of layer 30. An adhesive layer 46 is used to attach a plastic (e.g., PVC) layer 48 which contains and/or on which is mounted a booster antenna 47 to the ferrite layer. Layers 42, 44, 46, and 48 and the booster antenna 47 are formed in a similar manner as the corresponding number components shown in FIG. 2 and serve the same or similar functions. The assembly comprising layers 30, 42, 44, 46 and 48 is laminated to form a card assembly.

A layer 52, which includes a signature panel and a magnetic stripe, may be attached to layer 48 before or after lamination.

IC module 7 which includes a chip 7a and a chip antenna 7b and a set of contacts 7c is positioned within hole/opening and is glued in place. Physical connections extend between the booster antenna 47 and the chip antenna 7b.

Unlike other designs known in the art, a deliberately large gap between the chip and the sides of the opening is not required to provide suitable RF functionality.

As outlined in U.S. Pat. No. 10,289,944, the plug provides support for the IC module and a degree of electrical insulation and isolation from the metal layer.

Shielded Laminated Smartcard

FIG. 2 shows a shielded, laminated metal laminated shielded card (SC) 1600B having two coupling frame metal layers and a front face (ML1) which is a continuous metal layer (no slit). Some of the metal layers are the same (or similar) to those shown in the construction of FIG. 16A of U.S. Pat. No. 10,193,211.

Notably different, however, is that the top metal layer (ML1) does not have a slit (there is no "S1" in this embodiment). The second metal layer (ML2) has a slit (S2), and the third metal layer (ML3) has a slit (S3), as in the construction of FIG. 16A of U.S. Pat. No. 10,193,211, and the various layers may be held together (laminated) with layers of adhesive, as shown. The dimensions of the various layers may be similar to those in the construction of FIG. 16A of U.S. Pat. No. 10,193,211.

The front face (ML1) 1620A, as shown, does not have a slit, and may interact with the reader electromagnetic field and produce induced eddy currents within its body. These eddy currents will normally produce a counter-field resulting in reduction or blocking of the communication between the transponder chip module and reader. To offset this, a shielding layer (SL) 1640 of suitably chosen magnetic material may be placed between the front continuous metal layer and the coupling frame layers (ML2, ML3) of the card. A layer of adhesive 1622 having a thickness of 20 µm may be disposed between the front metal layer ML1 and the shielding layer SL. A layer of adhesive 1623 having a thickness of 20 µm may be disposed between the shielding layer SL and the second metal layer ML2.

The front metal layer (ML1) may have a thickness of 200 µm, rather than 300 µm (or 320 µm) as in the construction of FIG. 16A of U.S. Pat. No. 10,193,211. The shielding layer (SL) may have a thickness of approximately 50-200 µm, such as 100 µm (which was gained by making the front layer thinner than in the construction of FIG. 16A). In this manner the coupling frames will be shielded from the attenuating front metal layer and continue to function in conjunction with the transponder chip module (TCM).

Other elements of the FIG. 2 embodiment, such as the second metal layer ML2 and third metal layer ML3 may be substantially similar or identical to corresponding (similarly numbered) elements in the embodiment of FIG. 16A of U.S. Pat. No. 10,193,211. Generally, the top metal layer ML1 of FIG. 16A of U.S. Pat. No. 10,193,211 is replaced by a metal layer ML1 without a slit and a shielding layer SL.

The module antenna (MA) of the transponder chip module (TCM) may reside in a plane that lies below the continuous front metal layer (ML1). The module antenna (MA) may be surrounded on all edges (sides) by magnetic shielding material (not shown) to reduce the attenuation from eddy currents in the front metal layer (ML1). In this manner the performance of the magnetic shielding material may be maximized and the coupling of the transponder chip module (TCM) with the coupling frame layers (ML2, ML3) may be improved.

The prior art is silent on the retention of the metal sound with the card body comprising of material (several adhesive layers and a magnetic shielding layer) which dampens the drop acoustics of the metal card.

This disclosure further relates to dual interface metal transaction cards comprising two metal layers with at least one slit in each metal layer separated by an adhesively coated dielectric and laminated to synthetic layers to form a metal face transaction card with the objective that the drop acoustics of the metal transaction card sound like metal and not plastic. Retention of the metal sound requires careful selection of the adhesive system and the dielectric (carrier); the thickness of the adhesive layers and the carrier; the melt temperature of the adhesive; the crosslinking processing stage of the adhesive; the choice of each metal layer and their thickness; the choice and thickness of the synthetic layers and the lamination cycle or cycles and its or their respective lamination parameters (pressure, temperature and dwell time). The choice of the adhesive system and the carrier also impacts the ageing of the milling tools used to reduce an inlay of a given format to individual card bodies, in chamfering the card body edges at an angle, and forming a pocket in each card body for later insertion of a dual interface chip module.

FIG. 3A is a diagram (exploded perspective view) of the stack-up construction of a dual interface metal face smartcard (SC: 300AM or transaction card (TC)) with contactless "tap-to-pay" function from the rear side of the card body, having a booster antenna circuit (BAC: 344) mounted on (behind) a magnetic shielding layer (SL: 342) via an adhesive layer (AL: 343) with both component elements sandwiched between a front face solid (continuous) metal layer (FML: 330) and a rear metal layer (RML: 350). The RML may be considered to be an "interlayer" between a rear synthetic (graphic) layer (360) and the front metal layer.

The front face solid metal layer (FML: 330) is a continuous metal layer (CML), meaning that is has no discontinuity in the form of a slit. A module opening (MO: 312) is disposed in the front face metal layer (FML). The front face metal layer may also be a discontinuous metal layer (DML), having a slit.

The rear metal layer (RML: 350), which may be referred to as an "interlayer", is also a continuous metal layer without a slit, and has a shaped cut-out (CO: 314A) and a metal ledge (316A), to function as a coupling frame (CF) for contactless communication.

The module opening (MO: 312) and cut-out (314A) accept the placement of a transponder chip module (TCM: 310) with its module antenna (MA: 311) inductively coupling with the coupler coil (CC: 344C) of the booster antenna circuit (BAC: 344) and simultaneously overlapping the metal ledge (316A) of the cut-out (CO: 314A) in the metal interlayer (350). The dimensional arrangement of the module antenna (MA: 311), coupler coil (CC: 344C) and the metal ledge (316A) around the cut-out (CO: 314A) is one of concentricity.

The transponder chip module may have contact pads (CP) on its front (exposed) surface for effecting contact communication with an external reader. The module antenna (MA) provides for contactless communication with an external reader. Generally, the transponder chip module (TCM) described herein, and the resulting smartcard (SC), has at least contactless capability, and may be dual interface (contact, and contactless).

The stack-up construction of the card body (CB: 300A) (smartcard (SC) or transaction card (TC)) with a front face continuous metal layer without a discontinuity and a rear continuous metal layer having a cut-out or cut-outs may comprise the following layers (all dimensions and parameters are exemplary and approximate):

310: Dual-interface transponder chip module (TCM) or inductive coupling module (ICM) with an arrangement of pads on its front face (contact side) and having a module antenna (MA: 311) on its rear face (bond side);

311: A module antenna (MA) with a given number of windings (12 to 24 turns) depending on the input capacitance of the RFID chip (not shown);

312: Module opening (MO) with a P1 metal ledge 313 in the front face metal layer (ML: 330), without a slit (no slit extending from the module opening to the periphery of the FML);

313: Metal ledge to mechanically support the transponder chip module (310), being attached to the metal ledge using an adhesive tape (not shown);

314A: Cut-out (CO) stuffed with a plastic slug (315A)) with a P2 metal ledge (316A) on the rear metal interlayer (350), without a slit, and functioning as a coupling frame;

315A: A color matching plastic slug with or without an adhesive backing filling the metal cut-out (314A) (i.e., filling the gap or void in the rear metal layer 350);

316A: Metal ledge P2 with its metal edge following the contour of the module antenna (311) for inductive coupling;

The cut-out 314A stuffed with a plastic slug 315A on the left hand-side of the metal card body may be accompanied by a second cut-out 314B on the right hand-side of the metal card body stuffed with a plastic slug 315B;

376: The operation of laser marking or laser ablation of the top-coat protective layer (324) with personalization data;

324: Top-coat protective layer—a coating of matte or gloss finish applied using a roller coater or screen printer which can be laser marked or ablated for personalization, and protecting an underlying clear coat of rigid ink (325);

325: A transparent coat of rigid ink (hard coat) for scratch protection applied by means of digital printing over the graphic ink layer (326);

326: A digitally printed ink (color) layer which may comprise stretchable (flexible) or rigid (hard) ink deposited on the continuous metal layer (330) using a primer to promote adhesion; The total thickness of the top-coat protective layer (324), the transparent hard coat (325) and the graphic print layer of ink and primer (326) applied to the continuous metal surface (330) is typically 45 µm.

330: Front face metal layer (FML) without a slit ("continuous"), which may have the print layer 326 (ink and primer) disposed on it. A typical thickness for this metal layer may be 203 µm;

338: Adhesive layer (25 µm)—thermosetting adhesive (epoxy or polyurethane)—to attach the magnetic shielding layer (342) to the rear side of the front face metal layer (330);

342: High permeability magnetic sheet shielding layer (SL, or MSL) with a thickness of 50 µm, 65 µm, 75 µm or 100 µm which may comprise: calcium carbonate ($CaCO_3$), silicon dioxide ($SiO_2$), magnesium fluoride ($MgF_2$), $SiO_2$, chromium (Cr) and iron (Fe), to offset the effects of electromagnetic shielding caused by the front face metal layer (330) and having a booster antenna circuit (344) assembled to its rear surface (face-down side) by means of an adhesive layer (343);

344: Closed-loop booster antenna circuit (chemically etched, plated copper tracks, conductive printed tracks, wire embedding or equivalent) attached to the high permeability magnetic shielding layer, low magnetic loss ferrite layer or non-ferrite layer (342) (50 µm, 75 µm or 100 µm in thickness) by means of an adhesive layer (343) (50 µm) also referred to as an adhesive spacing layer, with the booster antenna circuit (BAC) comprising of a perimeter coil (344A), a coupler coil (344C) and a set of parallel plate trimming capacitors (capacitor bank for tuning not shown), with the booster antenna circuitry (BAC) being assembled on a PET carrier layer (23 µm) (344B) having a top antenna layer (perimeter coil (344A) with 12 windings (copper track width: 150 µm, spacing between tracks: 100 µm, copper track thickness: 18-35 µm—total width of perimeter coil: 2.9 mm)) vertical interconnects and the upper capacitor plate electrodes with said top antenna layer facing the magnetic shielding layer (342), and having a bottom antenna layer (coupler coil (344C) with 9 windings (copper track width: 250 µm, spacing between tracks: 100 μm, copper track thickness: 18-35 μm-total width of coupler coil: 3.05 mm)) connection jumpers and the lower capacitor plate electrodes with said bottom antenna layer facing the rear metal interlayer (350) acting as a coupling frame.

The perimeter coil (344A) with 12 turns spanning a width of 2.9 mm is positioned as close as possible to the edge of the metal interlayer (350) to achieve optimum RF performance. The distance may be set to 450 μm or lower. The RF performance decays rapidly with increasing distance of the perimeter coil (344A) from the edge of the continuous metal layer (350) with cut-outs (314A and 314B). Secondary coils for tuning and harvesting may be arranged around the position of the cut-outs (314A and 314B) in the metal layer (350).

The coverage of the module antenna (MA: 311) sitting on the footprint of the coupler coil (CC: 344C) is ideally 100%, while the coupler coil (CC: 344C) overlapping the metal ledge (316) of the cut-out (CO: 314A) should ideally be 50%.

Notably, the arrangement of the perimeter coil and the coupler coil on the PET carrier layer being respectively positioned on the top and bottom surfaces thereof may be interchanged or portions of their antenna structures may be located on both sides of the carrier layer;

The booster antenna circuit (BAC) may be similar to a booster antenna as disclosed in U.S. Pat. No. 9,033,250, but the circuitry is a closed loop with no open-ended antenna elements and having an integrated parallel plate capacitor bank for frequency trimming. The capacitor plates are in parallel with the coupler coil and perimeter coil. The booster antenna circuit (BAC) may be referred to as an "amplifying element".

348: Adhesive layer (25 μm)—thermosetting adhesive (such as epoxy or polyurethane) —assembled between the bottom side of the booster antenna circuit (BAC: 344) and the metal interlayer (350) with the cut-out (CO: 314A) and metal ledge (315A);

350: Metal interlayer with at least one cut-out (CO: 314A) and a metal ledge (316A) having a metal edge which surrounds (partially) the module antenna (MA: 311), having a thickness of approximately 152 μm is attached to the rear synthetic layers by an adhesive layer (358);

358: Adhesive layer (25 μm)—thermosetting adhesive (epoxy or polyurethane)—attaching the metal interlayer (350) to the top side of the synthetic layer (360);

360: Transparent, translucent, white or colored synthetic layer (e.g. PVC, PC, PETG), typically having a thickness of 125 μm;

362 primer;

364 ink (printed information (PI));

The position of (362) and (364) may be interchangeable depending on the printing process. In some instances, the primer may be omitted. The thickness of the print layer (360) may be significantly reduced when the ink deposition process is digital.

370: Laser engravable overlay layer (PVC) typically having a thickness of 60 μm;

374: Magnetic stripe mounted to the rear overlay layer (370);

376: The operation of laser marking the rear overlay layer (1170) with personalization data; and Security elements (signature panel and hologram) are not shown.

To increase the activation distance of the smartcard (300A), an additional cut-out (CO: 314B) may be formed in the rear continuous metal layer (350), with the cut-out crossing the tracks of the perimeter coil 344A to pick up surface currents. The metal edge of the cut-out 314B may also interact with a secondary coil arranged within the void area.

Security elements (signature panel and hologram) are not shown.

FIG. 3B is a modification of FIG. 3A having a shaped cut-out segment (314A) which removes metal along the entire left-hand-side of the rear continuous metal layer (350) with the void filled with a non-conductive material (315A) such as plastic. The cut-out segment (314A) has a metal ledge (316A) which forms a boundary interface between the conductive metal and the non-conductive plastic.

FIG. 3C has two shaped cut-out segments (314A and 314B) which removes metal along the entire left- and right-hand sides of the rear continuous metal layer (350) with the voids filled with a non-conductive material (315A and 315B). The cut-out segments (314A and 314B) have respectively metal ledges (316A and 316B) which form a boundary interface between the conductive metal and the non-conductive plastic on each side of the rear continuous metal layer (350). The perimeter coil (344A), secondary coil (not shown) and coupler coil (344C) of the booster antenna circuit (344) can be routed along the boundary interface, overlapping the conductive metal and non-conductive plastic.

FIG. 4A is a diagram showing a top layer of a plated copper antenna circuit with a perimeter coil (444A) connected to top electrodes of a capacitor bank (444D) on a PET carrier layer 444B, forming part of a card body 400A. The perimeter coil is routed very closely to the edges of the card body and inductively couples with the metal edges of the continuous metal layer on the rear side of the card body.

FIG. 4B is a diagram showing a bottom layer of a plated copper antenna circuit with a coupler coil (444C) on the underside of the aforementioned PET carrier layer 444B and connected to bottom electrodes of the capacitor bank (444E). The coupler coil inductively couples simultaneously with the module antenna of the transponder chip module and the metal ledge following the path of the cut-out in the continuous metal layer. A secondary coil (444F) may be integrated into the booster antenna circuit to enhance RF performance.

FIG. 4C is a exploded stack-up view of the rear layers of a smartcard having a booster antenna circuit (444) assembled to a continuous metal layer (450), with the booster antenna circuit having a perimeter coil (444A), a coupler coil (444C) and frequency trimming capacitor electrodes (444D and 444E), and the continuous metal layer (450) having a metal ledge (416A) following the path of a first cut-out (414A) and in addition having a second cut-out (414B) with a metal ledge (416B) to improve the activation distance in contactless mode.

The outer windings of the perimeter coil (444A) are arranged to be as close as possible to the metal edges of the continuous metal layer (450) preferably under 500 μm, with the windings overlapping the cut-outs (414A and 414B) and the metal ledges (416A and 416B). The coupler coil (444C) overlaps the metal ledge (416A) following the path of the cut-out (414A) in the continuous metal layer (450). In addition, the coupler coil inductively couples with the module antenna (411) of the transponder chip module. To further enhance RF performance, a secondary coil (444F) connected to the perimeter coil (444A) may also overlap the metal ledge (416B) and the cut-out (414B).

As an embodiment of the invention, the booster antenna circuit (BAC) with a perimeter coil, secondary coil and a coupler coil overlap a boundary interface between a conductive and non-conductive surface, with the coupler coil inductively coupled to the module antenna of the transponder chip module (TCM). Comparison is made to FIG. 7 of US 2021/0049431 in which the module antenna (MA) directly overlaps the boundary interface, to pick up surface currents, but this configuration has limitations in terms of surface area and current density concentration. In the current invention, the perimeter coil and the secondary collect surface currents from the entire area of the metal card body to drive the transponder chip module (TCM) via inductive coupling with the coupler coil (CC).

FIG. 5A is a diagram (exploded perspective view) of the stack-up construction of a dual interface metal face smartcard 500A with contactless "tap-to-pay" function on one side of the card body having an in-card perimeter coil circuit 544 (without a coupler coil) mounted on a magnetic shielding layer 542 with both components sandwiched between a front face metal layer 530 and a rear metal interlayer 550. The in-card perimeter coil circuit 544 having a given number of turns or windings 544A has its wire ends 544C galvanically connected to a chip module (CM) 510 (without a module antenna), and the perimeter coil circuit 544A is routed along the outer edges of the card body with its antenna tacks crossing or overlapping a straight or shaped slit (in a direction parallel or perpendicular to the slit) which extends to a module opening (MO) 514 in an underlying metal interlayer 550 functioning as a coupling frame.

The front face solid metal layer 530 is a continuous metal layer with no discontinuity. The metal interlayer 550 is a discontinuous metal layer having a slit (S) 520 and a module opening (MO) 514 to accept the insertion of a chip module (CM) 510. The antenna termination points ($L_a$ and $L_b$) on the bond side of the chip module (CM) 510 are galvanically connected to the wire ends of the perimeter coil circuit 544C which in the prior art would have been connected to a coupler coil (CC) or would have formed the coupler coil (CC) for inductive coupling with a module antenna (MA) in a transponder chip module (TCM). The stack-up construction of the card body (CB) 500A (smartcard (SC) or transaction card (TC)) with a front face continuous metal layer without a discontinuity may comprise the following layers (all dimensions are exemplary and approximate):

510: Chip module with termination points for an electrical connection to the in-card perimeter coil circuit 544;
512: P1 Module opening (MO), in front face metal layer (ML1) 530 without a slit;
513: Optionally, a metal ledge for mechanical support of the chip module 510;
514: P2 Module opening (MO) in the metal interlayer 550 with a slit 520, with the module opening (MO) stuffed with a plastic slug or insert 515;
516: Metal ledge P2 surrounding the module opening (MO) 514 for interfacing or coupling with the antenna tracks 544A of the in-card perimeter coil circuit 544;
520: Slit (S) in the metal interlayer 550 acting as a coupling frame for contactless communication;
576: Operation of laser marking the laser reactive protective layer 524 with personalization data;
524: Laser reactive protective layer (10 μm)—a hard top-coat lamination film or a deposited coating (ink, varnish, enamel, lacquer or a polymer as a matte or gloss finish) which can be laser marked or laser engraved;
525: A hard coat layer of rigid ink for scratch protection (10 μm) as opposed to stretchable ink used in the deposition of the print layer 526;

Note rigid ink may also be inkjet deposited to produce the print layer 526;
526: A print layer (35 μm) which may comprise: (i) a digital, silk screen, lithographic or thermo-graphic layer of clear or colored ink, (ii) a baked-on-ink layer, (iii) a PVD or DLC coating, or (iv) a combination thereof, including an adhesion promoter or primer applied between the metal layer 530 and subsequent print/coating layers;
530: Front face metal layer without a slit ("continuous"), which may have the print layer 526 disposed on it. A typical thickness for this metal layer may be 203 μm;
538: Adhesive layer (25 μm)—thermosetting adhesive (epoxy or polyurethane)—to attach the magnetic shielding layer (ferrite or non-ferrite layer) 542 to the rear side of the front face metal layer 530;
542: High permeability magnetic sheet shielding layer with a thickness of 50 μm, 65 μm or 75 μm to offset the effects of electromagnetic shielding caused by the front face metal layer 530 and having an in-card perimeter coil 544 assembled to its face downside by means of an adhesive layer 543;
544: An in-card perimeter coil circuit attached to the high permeability magnetic shielding layer 542 by means of the adhesive layer 543, with the perimeter coil circuit comprising a perimeter coil (PA, 544A) and wire ends (544C) intended for a galvanic connection to the antenna termination points on the bond side of the chip module 510, a set of parallel plate trimming capacitors, vertical interconnects and jumpers. The circuit may further comprise of secondary coils for harvesting energy;
548: Adhesive layer (25 μm)—thermosetting adhesive (epoxy or polyurethane)—spanning the entire width and length of the card body, being assembled to the bottom side of the perimeter coil circuit 544 and the metal interlayer 550 with a module opening (MO) 514 stuffed with a plastic slug 515 and a slit (S) 520;
550: Metal interlayer with a module opening MO 514 (stuffed with a plastic slug 515), a metal ledge 516 and a slit (S) 520 having a thickness of approximately 152 μm is attached to the rear synthetic layers by an adhesive layer 558;
558: Adhesive layer (25 μm)—thermosetting adhesive (epoxy or polyurethane)—attaching the metal interlayer 550 to the top side of the synthetic layer 560;
560: Transparent, translucent, white or colored synthetic layer (e.g. PVC, PC, PETG), typically having a thickness of 125 μm;
562 primer;
564 ink (printed information (PI));
The position of 562 and 564 may be interchangeable depending on the printing process.
570: Laser engravable overlay layer (PVC) typically having a thickness of 60 μm;
574: Magnetic stripe mounted to the rear overlay layer 570;
576: Operation of laser marking to the rear overlay layer 570 with personalization data; and Security elements (signature panel and hologram) are not shown.

FIG. 5B is a similar diagram to FIG. 5A showing the stack-up construction of a dual interface metal face smartcard 500B with contactless "tap-to-pay" function on one side of the card body having a metal interlayer 550 with two opposing slits (520A and 520B) to function as a coupling frame, with the antenna tracks (544A) of the perimeter coil circuit (544) crossing or overlapping both slits (in a direction parallel or perpendicular). The openings (514A and 514B) in the metal interlayer 550 are stuffed with plastic slugs (515).

FIG. 5C is a detail view of a perimeter coil circuit 544 with its antenna tracks 544A crossing or overlapping a straight or shaped slit 520 extending to an opening 514 in the rear discontinuous metal layer 550 whereby the antenna tracks separate or widen (thereby increasing the pitch between antenna tracks) at the position of the slit 520 and opening 514 to collect surface currents. The addition of secondary coils may further booster the collection of surface currents in driving the contactless interface over a greater activation distance.

It is an object of the current invention to produce a robust metal transaction card having a front face continuous metal layer (without slit) and a rear face discontinuous metal layer (with at least one straight or shaped slit terminating in a module opening) to function as a coupling frame, with the metal layers sandwiching a magnetic shielding layer and a perimeter coil circuit (without a coupler coil). The perimeter coil circuit having antenna tracks which cross, overlap or pass within at least one of the straight or shaped slits (in a direction parallel, perpendicular or a combination thereof to the orientation of the slit(s)) and with the wire ends of the perimeter coil circuit galvanically connected to termination points on the bond side of a dual interface chip module (a wire bonded or a flip chip package). These termination points are further connected within the chip module package to the antenna connection pads ($L_a$ and $L_b$) on the RFID die. The perimeter coil may have antenna tracks which are routed around the outer edges of the rear face discontinuous metal layer to harvest energy from the electromagnetic field, with the antenna tracks widening at the position of the straight or shaped slit and extending to an opening in the rear face discontinuous metal layer to collect surface currents at the metal edges of the slit and opening or to collect surface currents from within the slit and opening, or a combination of both.

Polyurethane (PU)

Polyurethane is formed by reacting a polyol (an alcohol with more than two reactive hydroxyl groups per molecule) with a diisocyanate or a polymeric isocyanate in the presence of suitable catalysts and additives.

Casting of Metal Inlays

A metal layer, with an array of card body sites comprising of a module opening and optionally a slit at each site, is covered on one side with a sacrificial layer (with low tack adhesive), to create pockets and channels on the other side of the metal layer.

The mold contains a hollow cavity of the desired metal inlay shape and size, the casting material is dispensed into the mold and leveled using a doctor blade, and then allowed to solidify.

The solidified metal inlay (i.e. casting) is ejected out of the mold to complete the process. The casting material is a time setting liquid that cures after mixing two or more components together; an example is thermosetting polyurethane (PU).

In general, casting polyurethane consists of a two-component system of resin and hardener, which hardens after mixing through a chemical reaction. PU casting resins can, just like epoxy resin and polyester resin, be combined with various additives as well as filling materials or colorants. This gives them the desired properties. For example, an inhibitor can be added to the resin to increase the so-called pot life, i.e., the processing time.

There are also color pigments and fluorescent dyes that can give the polyurethane resin a specific color. Examples of fillers are, among others, cotton flocks, glass fibers, mineral fillers, and lightweight fillers. Also, fillers can be added to the resins to influence properties such as mechanical strength, stiffness, surface hardness, and in the case of metal transaction cards the fillers influence the drop acoustics. (https://en.wikipedia.org/wiki/Casting; and https://resin-expert.com/en/guide/polyurethane-resin)

Applying Polyurethane Resin to Metal

In applying polyurethane resin to metal, the metal surface needs to be primed and or blasted. The primer may be in the form of a flexible adhesive or a chemical bonding agent.

In bonding polyurethane resin to metal, consideration must be given to following: the surface finish of the metal, the metal cleaning process, the age and mixture of the chemical bonding agent, the thickness of the bonding agent when applied, the drying process, the formulation of the polyurethane, the process temperature, self-leveling and removal of gases under vacuum, the gel time and the full cure time.

The metal surface must be clean, dry and free from contamination (a solvent wipe of isopropanol) before bonding.

The bonding agent may be applied to the metal surface using conventional techniques of brushing, dipping, spraying or rod coating. The deposition is followed by a drying and/or pre-bake step. The dry coating (single coat) typically has a film thickness of 5-15 μm.

In theory, based on a set point at a set temperature, the gel time decreases by half for each 10° C. increase in temperature. Conversely, the gel time doubles for each 10° C. decrease in temperature.

Casting Polyurethane Resin to Replace Adhesive Film Layers, Plastic Slugs and to Fill Module Openings, Cut-Outs and Voids in a Metal Transaction Card, and to Safeguard the Drop Acoustics of the Metal Card In FIG. 3A, the stack-up construction of the card body (CB: 300A) with a front face continuous metal layer and a rear continuous metal layer having a cut-out or cut-outs may be modified as follows.

- The module opening (MO: 312) in the front face continuous metal layer (330) may be filled with polyurethane resin.
- The adhesive layer (338), thermosetting adhesive (epoxy or polyurethane) (25 μm), to attach the magnetic shielding layer (342) to the rear side of the front face metal layer (330) may be replaced by polyurethane resin.
- The void in the magnetic shielding layer 342 (ferrite or non-ferrite layer) (50 μm, 65 μm, 75 μm or 100 μm in thickness) may be filled with polyurethane resin.
- The adhesive layer (343), also referred to as an adhesive spacing layer (50 μm), between the magnetic shielding layer (342) and the booster antenna circuit (344) may be replaced by polyurethane resin.
- The adhesive layer 348, thermosetting adhesive (epoxy or polyurethane) (25 μm), assembled between the bottom side of the booster antenna circuit (BAC: 344) and the metal interlayer (350) with the cut-out (CO: 314A) and metal ledge (315A) may be replaced by polyurethane resin.
- The shaped cut-out (CO: 314A) in the rear continuous metal interlayer (350) having a metal ledge (316A) to function as a coupling frame for contactless communication, may be filled with polyurethane resin.
- The color matching plastic slug (315A) intended to be inserted in the void or cut-out (CO: 314A) in the rear continuous metal interlayer (350) may be replaced by polyurethane resin.

The optional second cut-out 314B on the right hand-side of the metal card body intended to be stuffed with a plastic slug 315B may also be replaced by polyurethane resin.

The adhesive layer (358), thermosetting adhesive (epoxy or polyurethane) (25 µm), attaching the metal interlayer (350) to the top side of the synthetic layer (360) may be replaced by polyurethane resin.

In FIG. 3B, the shaped cut-out segment (314A) which removes metal along the entire left-hand-side of the rear continuous metal layer (350) leaving a void may be filled with polyurethane resin, instead of a non-conductive material (315A) such as plastic.

In FIG. 3C, the two shaped cut-out segments (314A and 314B) which removes metal along the entire left- and right-hand sides of the rear continuous metal layer (350) leaving voids may be filled with polyurethane resin, instead of a non-conductive material (315A and 315B) such as plastic.

In FIG. 5A, the stack-up construction of the card body (CB) 500A with a front face continuous metal layer and a rear discontinuous metal layer with a slit may be modified as follows:

The module opening (MO: 512) in front face metal layer (ML1) 530 without a slit may be filled with polyurethane resin.

The adhesive layer 538, thermosetting adhesive (epoxy or polyurethane) (25 µm), to attach the magnetic shielding layer (ferrite or non-ferrite layer) 542 with the rear side of the front face metal layer 530, may be replaced by polyurethane resin.

The void in the magnetic shielding layer 542 (50 µm, 65 µm, 75 µm or 100 µm in thickness) may be filled with polyurethane resin.

The adhesive layer (543), also referred to as an adhesive spacing layer (50 µm), between the magnetic shielding layer (542) and the booster antenna circuit (544) may be replaced by polyurethane resin.

The adhesive layer 548, thermosetting adhesive (epoxy or polyurethane) (25 µm), spanning the entire width and length of the card body, being assembled to the bottom side of the perimeter coil circuit 544 and the metal interlayer 550 may be replaced by polyurethane resin.

The module opening (MO: 514) and slit 520 in the rear metal interlayer 550 may be both filled with polyurethane resin, replacing the plastic slug 515 intended to be inserted or stuffed in the module opening (MO).

The adhesive layer 558, thermosetting adhesive (epoxy or polyurethane) (25 µm), attaching the metal interlayer 550 to the top side of the synthetic layer 560 may be replaced by polyurethane resin.

In FIG. 5B, the rear metal interlayer 550 with two opposing slits (520A and 520B) and openings (514A and 514B) may be filled with polyurethane resin, replacing the plastic slugs (515) intended to be stuffed in the openings.

Polyurethane-to-Metal Adhesion

Bonding polyurethane resin to a metal inlay having an array of card body sites may utilize both single and two-coat adhesive formulations. The metal inlay may be stainless steel.

Two-coat adhesive systems may comprise a primer layer and an adhesive topcoat. The primer provides a means of obtaining robust adhesion to the metal substrate while providing the necessary reactivity with the adhesive topcoat. An adhesive topcoat is applied to the dried primer. The topcoat provides a means of reacting with unsaturation in the polyurethane backbone, typically during the casting, coating or molding process. The topcoat also must react with the primer layer such that adhesive and primer inter-coat adhesion is achieved. A typical adhesive topcoat may comprise of curatives, film-forming polymers, fillers, and a carrier system.

Within the bonded assembly, there are various interactions occurring at each of the interfaces such that overall adhesion is achieved. The primer-to-metal interface involves adsorption and/or chelation of the primer components at the surface of the metal. The primer-to-adhesive interface obtains inter-coat adhesion through the adsorption and/or diffusion of respective components within the layers. Cross-bridging of reactive topcoat chemistries into the primer and the polyurethane also occurs at each of these respective layers' interfaces. Within the adhesive and primer layers, internal crosslinking of the polymeric systems also occurs.

Roll Coating a Metal Inlay with Polyurethane Resin

A coating of polyurethane resin with a given temperature and viscosity may be roll coated to the rear surface of the metal inlay having received a coating of primer (chemical bonding agent) or a two-coat adhesive formulation. The thickness of the resin may be controlled by a doctor blade and a rotating drum to create an encapsulation layer of polyurethane having a controllable thickness (e.g. 25-50 µm), while at the same time filling any pockets or recesses with resin at each site in the array of card body sites; the encapsulation layer may be further compressed under vacuum to remove gases or air pockets, and left to cure to its final stage, typically after storage for a duration of one week; the solidified resin in its final curing state may be mechanically milled or planed to a preferred thickness before assembly to other layers in the card stack-up construction.

Roll Coating Both Sides of a Metal Inlay with Polyurethane Resin

A metal inlay, such as a stainless steel layer, may have its front and rear surface roughened through the process of sand blasting or chemical etching; the roughened metal surface may receive a coating of primer (chemical bonding agent) or a two-coat adhesive formulation; the metal inlay may have an array of card body sites, provided at each site with an opening and a slit to later accept the insertion of an electronic chip module (with a contact and contactless interface) having a module antenna for inductive coupling; with said opening and slit at each site laser cut; and post cutting of the openings and slits, a sacrificial layer is attached to one surface of the metal inlay; the sacrificial layer further covering the openings and slits in the metal inlay, and further forming pockets and channels at the position of the openings and slits in the metal inlay; a coating of polyurethane resin with a given temperature and viscosity is roll coated to the primed roughened surface of the metal inlay having a thickness controlled by a doctor blade and a rotating drum to create an encapsulation layer of polyurethane having a controllable thickness (e.g. 25-50 µm), while at the same time filling the pockets and channels with resin at each site in the array of card body sites; the sacrificial layer may be removed from the metal inlay, followed by coating its underlying surface also with a coating of polyurethane resin thus encapsulating the metal inlay on both sides; the fully cured solidified resin on both sides of the metal inlay may be mechanically milled (planed) to a preferred thickness; this subassembly of encapsulated metal may be laminated on both sides with synthetic layers having graphic artwork to produce a metal core transaction card. The polyurethane encapsulation on both sides of the metal inlay reinforces the slit and enhances the mechanical robustness of the metal card body. The polyurethane resin may be filled with glass fiber for increased strength and may be colored with a pigment.

FIG. 6

The following elements may be shown and described in FIG. 6 and may correspond with similarly numbered elements in FIG. 3A (e.g., 6nn may correspond with 3nn):

- 600 smartcard (SC) or transaction card
- 610 transponder chip module/inductive coupling chip module (TCM/ICM)
- 611 module antenna (MA)
- 630 front metal layer (ML, FML), which may be a continuous metal layer (CML)
- 624 protective coating on FML
- 676 markings on protective coating 624
- 626 graphic ink print layer
- 625 a transparent coat of rigid ink (hard coat) for scratch protection applied over the graphic ink layer (626), such as by means of digital printing
- 612 module opening (MO)
- 613 metal ledge
- 638 two coat adhesive system
- 642 magnetic shielding layer (MSL)
- 643 adhesive spacing layer (ASL)
- 644 booster antenna circuit (BAC)
- 644A perimeter coil circuit (PCC)
- 644C coupler coil (CC)
- PET carrier layer (no number), which may support the BAC on both sides of it
- 648 adhesive layer (AL)
- 650 rear metal layer (ML, RML), which may be a continuous metal layer (CML)
- 614A first cut-out segment in the RML
- 616A metal ledge around 614A
- 614B second cut-out segment in the RML
- 616B metal ledge around 614B
- 658 adhesive layer, such as thermosetting adhesive (epoxy or polyurethane)
- 660 graphic print layer (GPL), which may be a synthetic layer
- 662 primer
- 664 ink
- 668 polyurethane resin (PU)
- 670 overlay film or layer (OL), which functions as a protective coating
- 674 magnetic stripe mounted to the rear overlay layer (670)
- 676 markings on protective coating 670

FIG. 6, shows an embodiment which may be considered to be a modification of the embodiment shown in FIG. 3A, is a diagram (exploded perspective view) of the stack-up construction of a dual interface metal face smartcard (SC: 600) with contactless "tap-to-pay" function operating from the rear side of the card body with two metal layers, one continuous (ML, CML: 630) and the other continuous (ML, CML: 650), sandwiching electronic component elements encapsulated by polyurethane resin such as a booster antenna circuit (BAC: 644) mounted to a magnetic shielding layer (MSL: 642), with the booster antenna circuit (BAC: 644) attached to the rear continuous metal layer (ML, CML: 650) with at least one cut-out segment (614A and or 614B) in the rear metal layer and the magnetic shielding layer (MSL: 642) attached to the front continuous metal layer (ML, CML: 630), with the cut-out segment ((614A and or 614B) in the rear metal layer), module opening ((MO: 612) in the front metal layer) and voids in the layers forming the card body filled and sealed with polyurethane resin (PU: 668).

FIG. 6 is an exploded view of a smartcard or a transaction card (SC: 600) with a front face continuous metal layer (ML, CML: 630) having a module opening (MO: 612) sealed with cured polyurethane (PU) resin and recessed by CNC milling to accept the insertion of an inductive coupling chip module (TCM/ICM: 610). The rear side of the front face continuous metal layer may be surface treated and coated with a single coat of primer or a two-coat adhesive system (primer and an adhesive topcoat) to promote the adhesion of the polyurethane resin to the metal. The surface treatment of the metal may be chemically etched, or sand blasted to produce a scuffed-up surface. The primer may be a chemical bonding agent acting as an interface, or a two-coat adhesive formulation. The primer deposition method may be spraying, dipping or rod coating. After the deposition of the primer/adhesive system, the polyurethane resin may be applied, seeping into any opening, void or cavity, and encapsulating the entire area to a defined thickness.

A magnetic shielding layer (MSL: 642) with a void (opening) to allow for inductive coupling between the chip module (TCM/ICM: 610) and the coupler coil (CC: 644C) of the booster antenna circuit (BAC: 644) may be assembled to the polyurethane resin. The booster antenna circuit (BAC: 644) with or without a capacitor bank on a PET carrier layer may be assembled to the magnetic shielding layer (MSL: 642) using an adhesive spacing layer (ASL: 643). The circuitry may be encapsulated and sealed with a layer of polyurethane resin. A graphic print layer (GPL: 660) may be laminated to the cured polyurethane resin with its artwork protected by an overlay film (OL: 670).

In FIG. 6, the stack-up construction of the card body (SC: 600) with a front face continuous metal layer and a rear continuous metal layer having a cut-out or cut-outs may comprise the following layers:

The module opening (MO: 612) in the front face continuous metal layer (ML, CML: 630) may be filled with polyurethane resin (PU), by roll coating its backside with PU.

The adhesive layer (AL: 338) in FIG. 3A may be replaced by (substituted with) a single coat of primer or a two-coat adhesive system (638) to accept the adhesion of polyurethane resin (668) to metal, encapsulating the magnetic shielding layer (MSL: 642) to the rear side of the front face metal layer (ML, CML: 630).

The void in the magnetic shielding layer (MSL: 642, ferrite or non-ferrite layer) (50 μm, 65 μm, 75 μm or 100 μm in thickness) may be filled with polyurethane resin.

The adhesive layer (ASL: 643), also referred to as an adhesive spacing layer (50 μm), between the magnetic shielding layer (MSL: 642) and the booster antenna circuit (BAC: 644) may or may not be replaced by the polyurethane resin encapsulation. The void in the PET carrier layer may also be filled with polyurethane resin (668).

An adhesive layer (AL: 648), thermosetting adhesive (epoxy or polyurethane) (25 μm), may be assembled between the bottom side of the booster antenna circuit (BAC: 644) and the metal interlayer (ML, CML: 650) with the cut-out (CO: 614A) and metal ledge (615A).

The shaped cut-out (CO: 614A) in the rear continuous metal interlayer (ML, CML: 650) having a metal ledge (616A) to function as a coupling frame for contactless communication, may be filled with polyurethane resin.

The rear continuous metal interlayer (ML, CML: 650) may be coated one side or on both sides with polyurethane resin (668).

The color matching plastic slug (315A) intended to be inserted in the void or cut-out (CO: 314A) in the rear continuous metal interlayer (ML, CML 350) in FIG. 3A, may be replaced by polyurethane resin (668).

The optional second cut-out (CO: 314B) on the right hand-side of the metal card body (SC: 300A) intended to be stuffed with a plastic slug 315B in FIG. 3A, may also be replaced by polyurethane resin (668).

The adhesive layer (AL: 658), thermosetting adhesive (epoxy or polyurethane) (25 µm), may attach the metal interlayer (ML, CML: 650) with a coating of polyurethane resin (668) to the top side of the synthetic layer (660).

FIG. 7

The following elements may be shown and described in FIG. 7 and may correspond with similarly numbered elements in FIG. 5A (e.g., 7nn may correspond with 5nn), which may correspond with some similarly numbered elements in FIG. 3A (e.g., Inn may correspond with 3nn):

700 smartcard (SC), or transaction card
710 chip module (CM), which may not have a module antenna
IC integrated circuit of the chip module
730 front face metal layer (ML, FML), which may be a continuous metal layer (CML)
724 protective coating on FML
776 markings on protective coating 724
726 graphic ink print layer
725 a transparent coat of rigid ink (hard coat) for scratch protection applied over the graphic ink layer (726), such as by means of digital printing
712 module opening (MO)
713 metal ledge
738 single coat of primer or two-coat adhesive system
768 polyurethane resin (PU)
742 magnetic shielding layer (MSL)
743 adhesive spacing layer (ASL)
744 booster antenna circuit (BAC)
744A perimeter coil circuit (PCC), without a coupler coil (CC), of the BAC
744C wire ends of the PCC
738 adhesive system
742 magnetic shielding layer (MSL)
743 adhesive spacing layer (AL, ASL)
748 adhesive layer (AL), which may be thermosetting adhesive (epoxy or polyurethane)
768 polyurethane resin (PU)
750 rear metal layer (ML, RML), which may be a discontinuous metal layer (DML)
714 module opening (MO) in RML
716 metal ledge around the module opening (714)
720 slit (S) in the RML, extending from the MO to a peripheral edge thereof
768 polyurethane resin (PU)
758 adhesive layer
760 graphic print layer (GPL), which may be a synthetic layer
770 overlay film or layer (OL)
774 magnetic stripe mounted to the rear overlay layer (770)
776 markings on protective coating 770

FIG. 7, shows an embodiment which may be considered to be a modification of the embodiment shown in FIG. 5A, is a diagram (exploded perspective view) of the stack-up construction of a dual interface metal face smartcard (SC: 700) with contactless "tap-to-pay" function on one side of the card body having an in-card perimeter coil circuit (PCC: 744A, without a coupler coil) galvanically connected to a chip module (CM: 710, without a module antenna), and the perimeter coil circuit (744A) routed along the outer edges of the card body with its antenna tacks crossing or overlapping a straight or shaped slit (S: 720, in a direction parallel or perpendicular to the slit) at a module opening (MO: 714) in an underlying metal interlayer (ML, DML: 750) functioning as a coupling frame, wherein the metal layers are encapsulated at least on one side with polyurethane resin, wherein any opening or discontinuity in the metal layers is filled and sealed with polyurethane resin, and wherein the electronic elements and circuitry and any voids in the layers making up the card construction are also encased in polyurethane resin.

FIG. 7 is an exploded view of a smartcard (SC: 700) with a front face continuous metal layer (ML, CML: 730) having an opening (MO: 712) sealed with cured polyurethane resin and recessed by CNC milling to accept the insertion of a chip module (CM: 710). The rear side of the continuous metal layer (ML, CML: 730) may be surface treated and disposed with a single coat of primer or a two-coat adhesive system (primer and an adhesive topcoat) to promote the adhesion of the polyurethane resin to the metal. The surface treatment of the metal may be chemically etched, or sand blasted to produce a scuffed-up surface. The primer may be a chemical bonding agent acting as an interface, or a two-coat adhesive formulation. The primer deposition method may be spraying, dipping or rod coating. After the deposition of the primer, the polyurethane resin may be applied (by means of roll coating), seeping into any opening, void or cavity, and encapsulating the entire area to a defined thickness.

A magnetic shielding layer (MSL: 742) with a void to allow for the galvanic (wired) interconnection between the chip module (CM: 710) and the perimeter coil (744A, wire ends represented by 744C) of the booster antenna circuit (BAC: 744) may be assembled to the polyurethane resin (PU). The booster antenna circuit (BAC: 744) with or without a capacitor bank on a PET carrier layer with electrical traces for galvanic connections may be assembled to the magnetic shielding layer (MSL: 742) using an adhesive spacing layer (ASL: 743). The circuitry may be encapsulated and sealed with a layer of polyurethane resin (PU).

A rear discontinuous metal layer (ML, DML: 750) with a module opening (MO: 714) and a slit (S: 720) may be disposed on one side or both sides with an adhesion promoter in the form of a chemical bonding agent or a two-coat adhesive system. Polyurethane resin may be applied to the primed metal surface, filling any opening, discontinuity, void or cavity in the metal layer (ML, DML: 750). A graphic print layer (760) may be laminated to the cured polyurethane resin with the artwork protected by an overlay film or layer (OL: 770).

In FIG. 7, the stack-up construction of the card body (SC: 700) with a front face continuous metal layer and a rear discontinuous metal layer with a slit may comprise the following layers:

The module opening (MO: 712) in front face metal layer (ML, CML: 730) without a slit may be filled with polyurethane resin.

The adhesive layer (AL: 538) in FIG. 5A may be replaced by a single coat of primer or a two-coat adhesive system (738) to accept the adhesion of polyurethane resin (768) to metal, encapsulating the magnetic shielding layer (MSL: 742, ferrite or non-ferrite layer) to the rear side of the front face metal layer (ML, CML: 730).

The void in the magnetic shielding layer (MSL: 742) (50 µm, 65 µm, 75 µm or 100 µm in thickness) may be filled with polyurethane resin (768).

The adhesive layer (ASL: 743), also referred to as an adhesive spacing layer (50 μm), between the magnetic shielding layer (MSL: 742) and the booster antenna circuit (BAC: 744) may or may not be replaced by the polyurethane resin encapsulation (768). The void in the PET carrier layer may also be filled with polyurethane resin (768).

The adhesive layer 748, thermosetting adhesive (epoxy or polyurethane) (25 μm), spanning the entire width and length of the card body, may be assembled to the bottom side of the PU encapsulated perimeter coil circuit (744, 744A) and the metal interlayer 750.

The module opening (MO: 714) and slit (S: 720) in the rear metal interlayer (ML, DML: 750) may be both filled with polyurethane resin (768), replacing the plastic slug 515 intended to be inserted or stuffed in the module opening (MO) in FIG. 5A.

The adhesive layer 758, thermosetting adhesive (epoxy or polyurethane) (25 μm), may attach the metal interlayer 750 to the top side of the synthetic layer 760.

FIG. 8 is an exploded view of a smartcard or a transaction card with a front face continuous or discontinuous metal layer disposed with a layer of transparent polyurethane resin and having a module opening (MO) equally sealed with polyurethane resin and recessed by CNC milling to accept the insertion of an inductive coupling chip module (TCM/ICM). The front and rear sides of the continuous or discontinuous metal layer may be surface treated and disposed with a primer (single-coat or a two-coat adhesive system) to promote the adhesion of the polyurethane resin to the metal. The surface treatment may be chemically etched, or sand blasted to produce a scuffed-up surface. The primer may be a thermosetting adhesive or a chemical bonding agent or a combination thereof acting as an interface. After the deposition of the primer, the polyurethane resin may be applied, seeping into any opening, void or cavity, and encapsulating the entire area to a defined thickness.

A magnetic shielding layer with a void to allow for inductive coupling between the chip module (ICM) and the coupler coil (CC) of the booster antenna circuit (BAC) may be assembled to the polyurethane resin. The booster antenna circuit (BAC) with a capacitor bank on a PET carrier layer (with void) may be assembled to the magnetic shielding layer using an adhesive spacing layer. The circuitry may be encapsulated and sealed with a layer of polyurethane resin. A graphic print layer may be laminated to the cured polyurethane resin with the artwork protected by an overlay film.

In their various embodiments, the invention(s) described herein may relate to payment smartcards (metal, plastic or a combination thereof), electronic credentials, identity cards, loyalty cards, access control cards, and the like.

While the invention(s) may have been described with respect to a limited number of embodiments, these should not be construed as limitations on the scope of the invention(s), but rather as examples of some of the embodiments of the invention(s). Those skilled in the art may envision other possible variations, modifications, and implementations that are also within the scope of the invention(s), and claims, based on the disclosure(s) set forth herein.

What is claimed is:

1. A method of manufacturing a smartcard (SC) having a front face metal layer (FML) and additional layers of adhesive, plastic, or synthetic material, said front face metal layer having a rear surface and a module opening (MO) to accept implanting of a chip module (TCM, ICM), said method comprising:
applying an adhesion promoter comprising a primer layer (PL) onto the rear surface of the front face metal layer;
allowing the primer layer to dry;
applying an adhesive top-coat (TC) onto the dried primer layer;
applying a sacrificial layer to a front side of the front face metal layer; and
coating the top-coat with thermosetting polyurethane resin (PU).

2. The method of claim 1, wherein:
the thermosetting polyurethane resin is coated onto the top-coat by a process of roll coating or slot nozzle coating.

3. The method of claim 1, wherein:
at least some of the additional layers of the smartcard have openings, voids, or cavities; and
the thermosetting polyurethane resin seeps into the openings, voids, or cavities.

4. The method of claim 1, wherein:
the thermosetting polyurethane resin encapsulates an entire area of the smartcard to which it is applied to a defined thickness.

5. The method of claim 1, further comprising, after the thermosetting polyurethane resin is fully cured, performing at least one of the following:
back-lapping the cured thermosetting polyurethane resin to reduce its thickness;
laser etching or mechanically engraving the cured thermosetting polyurethane resin; and
printing on the cured thermosetting polyurethane resin.

6. The method of claim 1, wherein:
the thermosetting polyurethane resin is filled with glass fiber for increased strength.

7. The method of claim 1, wherein:
the thermosetting polyurethane resin is colored with a pigment.

8. The method of claim 1, further comprising:
prior to applying the primer layer to the rear surface of the front metal layer, performing a surface treatment on the rear surface of the front metal layer to produce a scuffed-up surface.

9. The method of claim 8, wherein:
the surface treatment comprises chemically etching or sand blasting the rear surface of the front metal layer.

10. The method of claim 1, wherein:
the adhesion promoter comprises a chemical bonding agent (primer) acting as an interface, or a two-coat adhesive formulation.

11. The method of claim 1, wherein:
the adhesion promoter is deposited onto the rear surface of the front face metal layer by spraying, dipping or rod coating.

12. The method of claim 1, wherein:
the thermosetting polyurethane resin, when cured, contributes to the smartcard exhibiting a metallic sound when the smartcard is tossed on a hard surface.

13. The method of claim 1, further comprising:
after the thermosetting polyurethane resin is fully cured, removing the sacrificial layer.

14. A smartcard (SC) comprising:
a front face metal layer (FML) having a rear surface, and a module opening (MO) for accepting a transponder chip module (TCM);
wherein the rear surface of the front face metal layer is surface treated;
further comprising:
a coating of a single or two-coat adhesive layer disposed on the rear surface of the front face metal layer;

a sacrificial layer applied temporarily to a front side of the front face metal layer; and a layer of thermosetting polyurethane resin (PU) disposed on the single or two-coat adhesive disposed on the rear surface of the front face metal layer;

wherein the single or two-coat adhesive layer promotes adhesion of the laser of thermosetting polyurethane resin to the rear surface of the front face metal layer.

15. The smartcard of claim 14, wherein:

the adhesive layer is a two-coat adhesive layer comprising a primer layer and an adhesive top-coat.

16. The smartcard of claim 14, wherein:

the front face metal layer is continuous, and does not have a slit extending from a peripheral edge of the front face metal layer to the module opening.

17. A smartcard (SC) comprising:

a front face metal layer (FML) having a module opening (MO) for receiving a transponder chip module (TCM, ICM) having a module antenna (MA);

thermosetting polyurethane resin (PU) filling the module opening and any underlying voids, holes or recesses underlying the module opening;

a magnetic shielding layer (MSL) disposed behind the front face metal layer and having a void;

a booster antenna circuit (BAC) on a polyethylene terephthalate (PET) carrier layer disposed behind the magnetic shielding layer and having a void; and a rear metal layer (RML) having a first cut-out (CO) segment.

18. The smartcard of claim 17, further comprising:

a second cut-out (CO) segment in the rear metal layer.

19. The smartcard of claim 17, wherein:

the thermosetting polyurethane resin (PU) covers a front surface of the front face metal layer, is transparent, acts as a protective layer to protect against scratches, and accepts personalization data through laser or mechanical engraving.

20. The smartcard of claim 17, wherein:

the front face metal layer comprises highly polished stainless steel, brushed stainless steel, diamond-like carbon (DLC) or physical vapor deposition (PVD) coated stainless steel.

\* \* \* \* \*